(12) United States Patent
Koseoglu et al.

(10) Patent No.: US 11,268,037 B2
(45) Date of Patent: Mar. 8, 2022

(54) PROCESS AND SYSTEM FOR HYDRODEARYLATION AND HYDROGENATION OF AROMATIC COMPLEX BOTTOMS

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 26 days.

(21) Appl. No.: 16/790,546

(22) Filed: Feb. 13, 2020

(65) Prior Publication Data
US 2021/0253959 A1    Aug. 19, 2021

(51) Int. Cl.
| | | |
|---|---|---|
| C10G 65/12 | (2006.01) | |
| B01D 3/14 | (2006.01) | |
| B01J 19/24 | (2006.01) | |
| C10G 69/12 | (2006.01) | |

(52) U.S. Cl.
CPC ............ *C10G 65/12* (2013.01); *B01D 3/14* (2013.01); *B01J 19/245* (2013.01); *C10G 69/123* (2013.01); *B01J 2219/0004* (2013.01); *C10G 2300/107* (2013.01); *C10G 2300/1044* (2013.01); *C10G 2300/1077* (2013.01); *C10G 2300/1096* (2013.01); *C10G 2300/305* (2013.01); *C10G 2300/307* (2013.01); *C10G 2300/308* (2013.01); *C10G 2300/4006* (2013.01); *C10G 2300/4012* (2013.01); *C10G 2300/4018* (2013.01); *C10G 2400/04* (2013.01)

(58) Field of Classification Search
CPC .... C10G 11/18; C10G 51/026; C10G 57/005; C10G 69/04; C10G 2300/107; C10G 2300/1077; C10G 2300/301; C10G 2300/305; C10G 2300/307; C10G 2300/308; C10G 2400/02; C10G 2400/04; C10G 2400/20; B01J 8/1827; B01J 19/245; B01J 2219/0004; B01D 3/14
See application file for complete search history.

(56) References Cited

U.S. PATENT DOCUMENTS

| | | | |
|---|---|---|---|
| 2,301,391 | A | 11/1942 | Frey |
| 2,373,501 | A | 4/1945 | Peterson |
| 2,389,713 | A | 11/1945 | Atwell |

(Continued)

FOREIGN PATENT DOCUMENTS

| | | | |
|---|---|---|---|
| CA | 1137118 | A1 | 12/1982 |
| CA | 1168647 | A1 | 6/1984 |
| CA | 2356632 | A1 | 6/2000 |

OTHER PUBLICATIONS

PCT International Search Report and Written Opinion from corresponding PCT Application No. PCT/US2021/016280 dated Jun. 8, 2021.

(Continued)

*Primary Examiner* — Brian A McCaig
(74) *Attorney, Agent, or Firm* — Leason Ellis LLP

(57) ABSTRACT

Processes and systems are disclosed for improving the yield from reforming processes. Aromatic complex bottoms, or a heavy fraction thereof, are subjected to hydrodearylation and hydrogenation to produce additional gasoline blending components and aromatic products.

40 Claims, 5 Drawing Sheets

(56) References Cited

U.S. PATENT DOCUMENTS

| | | | |
|---|---|---|---|
| 3,159,565 | A | 12/1964 | Kimberlin, Jr. et al. |
| 3,172,842 | A | 3/1965 | Paterson |
| 3,197,518 | A | 7/1965 | Chapman et al. |
| 3,435,084 | A | 3/1969 | Cabbage et al. |
| 3,591,651 | A | 7/1971 | Carr et al. |
| 3,617,494 | A | 11/1971 | Montgomery |
| 3,625,879 | A | 12/1971 | Horne et al. |
| 3,836,344 | A | 9/1974 | Krawitz et al. |
| 4,022,681 | A | 5/1977 | Sheng et al. |
| 4,078,990 | A | 3/1978 | Brennan et al. |
| 4,211,886 | A | 7/1980 | Tabak et al. |
| 4,300,008 | A | 11/1981 | McCauley |
| 4,382,851 | A | 5/1983 | Angevine et al. |
| 4,645,585 | A | 1/1987 | White |
| 5,004,853 | A | 4/1991 | Barger et al. |
| 5,149,894 | A | 9/1992 | Holtermann et al. |
| 5,189,233 | A | 2/1993 | Larkin et al. |
| 5,210,333 | A | 5/1993 | Bellows et al. |
| 5,294,334 | A | 3/1994 | Kaul et al. |
| 5,382,734 | A | 1/1995 | Sardar et al. |
| 5,773,670 | A | 6/1998 | Gilbert et al. |
| 5,830,345 | A | 11/1998 | Lee et al. |
| 5,856,602 | A | 1/1999 | Gilbert et al. |
| 6,187,980 | B1 | 2/2001 | Gilbert |
| 6,187,987 | B1 | 2/2001 | Chin et al. |
| 6,448,436 | B1 | 9/2002 | Kreitman et al. |
| 6,740,788 | B1 * | 5/2004 | Maher .................... C07C 6/126 585/319 |
| 6,958,425 | B1 | 10/2005 | Bogdan et al. |
| 7,091,390 | B2 | 8/2006 | Jan et al. |
| 7,271,303 | B1 * | 9/2007 | Sechrist ................. C07C 6/126 208/108 |
| 7,638,667 | B2 | 12/2009 | Jan et al. |
| 7,687,423 | B2 | 3/2010 | Moscoso et al. |
| 7,745,678 | B2 | 6/2010 | Jan et al. |
| 8,927,800 | B2 | 1/2015 | Mahieux et al. |
| 9,145,522 | B2 | 9/2015 | Negiz et al. |
| 9,221,036 | B2 | 12/2015 | Koseoglu et al. |
| 9,283,553 | B2 | 3/2016 | Kim et al. |
| 9,328,299 | B2 | 5/2016 | Funk et al. |
| 9,382,173 | B2 | 7/2016 | Yanagawa et al. |
| 9,862,898 | B2 | 1/2018 | Ward et al. |
| 10,053,401 | B1 | 8/2018 | Beadle et al. |
| 10,081,009 | B2 | 9/2018 | Koseoglu et al. |
| 10,093,873 | B2 | 10/2018 | Koseoglu et al. |
| 10,357,761 | B2 | 7/2019 | Koseoglu et al. |
| 2016/0045841 | A1 | 2/2016 | Kaplan et al. |
| 2017/0009156 | A1 | 1/2017 | Pelaez |
| 2018/0066197 | A1 | 3/2018 | Koseoglu et al. |
| 2018/0230070 | A1 * | 8/2018 | Beadle .................... C07C 4/26 |
| 2019/0241486 | A1 | 8/2019 | Koseoglu et al. |

OTHER PUBLICATIONS

Kari Vahteristo, Kinetic Modeling of Mechanisms of Industrially Important Organic Reactions in Gas and Liquid Phase, (2010) Lappeenranta University of Technnology (Acta Universitatis Lappeenrantaensis 402).

Tung-Hsiung Kuo and Chuei-Tin Chang, Application of Mathematic Programming Model for Integrated Planning and Scheduling of Petroleum Supply Networks, Industrial & Engineering Chemistry Research (2008), vol. 47, No. 6, pp. 1935-1954.

G. C. Laredo, P. Pérez-Romo, J. Escobar, J. L. Garcia-Gutierrez, and P. M. Vega-Merino, Light Cycle Oil Upgrading to Benzene, Toluene, and Xylenes by Hydrocracking: Studies Using Model Mixtures, Industrial & Engineering Chemistry Research (2017), vol. 56, No. 39, pp. 10939-10948.

M. Chareonpanich, Z.-G. Zhang, and A. Tomita, Hydrocracking of aromatic hydrocarbons over USY-zeolite, Energy & Fuels (1996), vol. 10, No. 4, pp. 927-931.

* cited by examiner


PROCESS AND SYSTEM FOR HYDRODEARYLATION AND HYDROGENATION OF AROMATIC COMPLEX BOTTOMS

RELATED APPLICATIONS

Not applicable.

BACKGROUND OF THE INVENTION

Field of the Invention

This disclosure relates to catalytic reforming and aromatics recovery processes integrating conversion of aromatic complex bottoms including heavy alkylated aromatics into aromatic products and/or gasoline blending components.

Description of Related Art

Catalytic reformers are used in refineries to produce reformate, which is used as an aromatic rich gasoline blending fraction, and/or is used as feedstock to produce aromatic products. Due to stringent fuel specifications currently implemented or set for implementation worldwide, for example, requiring a level of ≤35 V % aromatics and a level of ≤1 V % benzene in gasoline, the reformate fraction is further treated to reduce its aromatics content. Treatment options for reduction of aromatics content include benzene hydrogenation and aromatics extraction. In benzene hydrogenation, the reformate is selectively hydrogenated to reduce the benzene content, and the total aromatics content is reduced by blending, if necessary.

In some refineries, naphtha is reformed after hydrodesulfurization to increase the octane content of the gasoline. Reformate contains a high level of benzene which must be reduced in order to meet requisite fuel specifications that are commonly in the range of from about 1-3 V % benzene, with certain geographic regions targeting a benzene content of less than 1 V %. Catalytic reforming, which involves a variety of reactions in the presence of one or more catalysts and recycle and make-up hydrogen, is a widely used process for refining hydrocarbon mixtures to increase the yield of higher octane gasoline. However, benzene yields can be as high as 10 V % in reformates. There currently exist methods to remove benzene from reformate, including separation processes and hydrogenation reaction processes. In separation processes, benzene is extracted with a solvent and then separated from the solvent in a membrane separation unit or other suitable unit operation. In hydrogenation reaction processes, the reformate is divided into fractions to concentrate the benzene, and then one or more benzene-rich fractions are hydrogenated.

In catalytic reforming, a naphtha stream is first hydrotreated in a hydrotreating unit to produce a hydrotreated naphtha stream. The hydrotreating unit operates according to certain conditions, including temperature, pressure, hydrogen partial pressure, liquid hourly space velocity (LHSV), and catalyst selection and loading, which are effective to remove at least enough sulfur and nitrogen to meet requisite product specifications. For instance, hydrotreating in conventional naphtha reforming systems generally occurs under relatively mild conditions that are effective to remove sulfur and nitrogen to less than 0.5 ppmw levels.

The hydrotreated naphtha stream is reformed in a reforming unit to produce a gasoline reformate product stream. The reformate is sent to the gasoline pool to be blended with other gasoline components to meet the required specifications. Some gasoline blending pools include $C_4$ and heavier hydrocarbons having boiling points of less than about 205° C. In catalytic reforming processes, paraffins and naphthenes are restructured to produce isomerized paraffins and aromatics of relatively higher octane numbers. Catalytic reforming converts low octane n-paraffins to i-paraffins and naphthenes. Naphthenes are converted to higher octane aromatics. The aromatics are left essentially unchanged, or some may be hydrogenated to form naphthenes due to reverse reactions taking place in the presence of hydrogen. The reactions involved in catalytic reforming are commonly grouped into the four categories of cracking, dehydrocyclization, dehydrogenation, and isomerization. A particular hydrocarbon/naphtha feed molecule may undergo more than one category of reaction and/or may form more than one product.

There are several types of catalytic reforming process configurations which differ in the manner in which they regenerate the reforming catalyst to remove the coke formed in the reactors. Catalyst regeneration, which involves combusting detrimental coke in the presence of oxygen, includes a semi-regenerative process, cyclic regeneration, and continuous catalyst regeneration (CCR). Semi-regeneration is the simplest configuration, and the entire unit, including all reactors in the series, is shut-down for catalyst regeneration in all reactors. Cyclic configurations utilize an additional "swing" reactor to permit one reactor at a time to be taken off-line for regeneration while the others remain in service. Continuous catalyst regeneration configurations, which are the most complex, provide for essentially uninterrupted operation by catalyst removal, regeneration and replacement. While continuous catalyst regeneration configurations include the ability to increase the severity of the operating conditions due to higher catalyst activity, the associated capital investment is necessarily higher.

Reformate is usually sent to an aromatic complex (also referred to as an "aromatics recovery complex" or ARC) for extraction of the aromatics. Reformate generally undergoes several processing steps in an aromatic complex to recover high value products including xylenes and benzene. In addition lower value products, for example toluene, can be converted into higher value products. The aromatics present in reformate are typically separated into different fractions by carbon number, such as $C_6$ benzene, $C_7$ toluene, $C_8$ xylenes and ethylbenzene. The $C_8$ fraction is typically subjected to a processing scheme to produce high value para-xylene. Para-xylene is usually recovered in high purity from the $C_8$ fraction by separating the para-xylene from the ortho-xylene, meta-xylene, and ethylbenzene using selective adsorption or crystallization. The ortho-xylene and meta-xylene remaining from the para-xylene separation are isomerized to produce an equilibrium mixture of xylenes. The ethylbenzene is isomerized into xylenes or is dealkylated to benzene and ethane. The para-xylene is separated from the ortho-xylene and the meta-xylene, typically using adsorption or crystallization. The para-xylene-free stream is recycled to extinction to the isomerization unit, and in the para-xylene recovery unit ortho-xylene and meta-xylene are converted to para-xylene and recovered.

Toluene is recovered as a separate fraction, and then may be converted into higher value products, for example, benzene in addition to or in alternative to xylenes. One toluene conversion process involves the disproportionation of toluene to make benzene and xylenes. Another process involves the hydrodealkylation of toluene to produce benzene. Both toluene disproportionation and toluene hydrodealkylation result in the formation of benzene. With the current and future anticipated environmental regulations involving benzene, it is desirable that the toluene conversion does not result in the formation of significant quantities of benzene.

The aromatic complex produces a reject stream or bottoms stream that is very heavy (typically boiling higher than about 150° C.), which is not suitable as gasoline blending components. Maximum sulfur, aromatics, and benzene levels of about 10 ppmw, 35 V %, and 1 V % or less, respectively, have been targeted as goals by regulators.

A problem faced by refinery operators is how to most economically utilize the aromatic complex bottoms. In some refineries, the aromatic complex bottoms are added to the gasoline fraction. However, the aromatic complex bottoms deteriorate the gasoline quality and in the long run impact the engine performance negatively, and any portion not added to the gasoline fraction is considered process reject material. Therefore, a need exists for improved systems and processes for handling aromatic complex bottoms.

SUMMARY

The above objects and further advantages are provided by the systems and processes for treating aromatic complex bottoms streams disclosed herein. In a conventional aromatic complex for separating heavy reformate, BTX/BTEX is recovered, but up to 20% of the heavy reformate comprises material that is typically considered process reject material or bottoms.

In embodiments herein, systems and processes for treatment of $C_9+$ aromatic complex bottoms are provided. These are obtained from catalytic reforming of naphtha followed by separation in an aromatic complex into a gasoline pool stream, an aromatic products stream and the $C_9+$ aromatic complex bottoms. In certain embodiments, the process comprises reacting a feedstream comprising all or a portion of the $C_9+$, the $C_{10}+$ or the $C_{11}+$ aromatic bottoms in the presence of a hydrodearylation catalyst and hydrogen under specified reaction conditions to produce a liquid effluent containing dearylated hydrocarbons (hydrodearylation effluents). The hydrodearylation effluents are reacted in the presence of a hydrogenation catalyst and hydrogen under specified reaction conditions to produce a liquid effluent containing hydrogenated hydrocarbons (hydrogenated effluents).

In certain embodiments, the process comprises separating all or a portion of the $C_9+$ aromatic bottoms into a tops fraction and a bottoms fraction; and reacting a feedstream comprising all or a portion of the bottoms fraction in the presence of a hydrodearylation catalyst and hydrogen, and further reacting hydrodearylation effluents in the presence of a hydrogenation catalyst and hydrogen to produce hydrogenation effluents. A portion of the $C_9+$ aromatic bottoms can be subjected to hydrodearylation, bypassing separation. In certain embodiments all or a portion of the tops fraction is supplied to a reactor in the presence of a transalkylation catalyst and hydrogen under specified reaction conditions for transalkylation of aromatics to produce $C_8$ aromatic compounds.

In certain of the above embodiments, the aromatic complex includes a xylene rerun unit, and the feedstream to hydrodearylation and/or separation comprises C9+ alkylaromatics from the xylene rerun unit. In certain of the above embodiments, the aromatic complex includes or is in fluid communication with a transalkylation zone for transalkylation of aromatics to produce $C_8$ aromatic compounds and $C_{11}+$ aromatic compounds, and the hydrodearylation feedstream comprises $C_{11}+$ aromatics from the transalkylation zone.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The process of the present disclosure will be described in more detail below and with reference to the attached drawings in which.

DETAILED DESCRIPTION

Figure 1A:
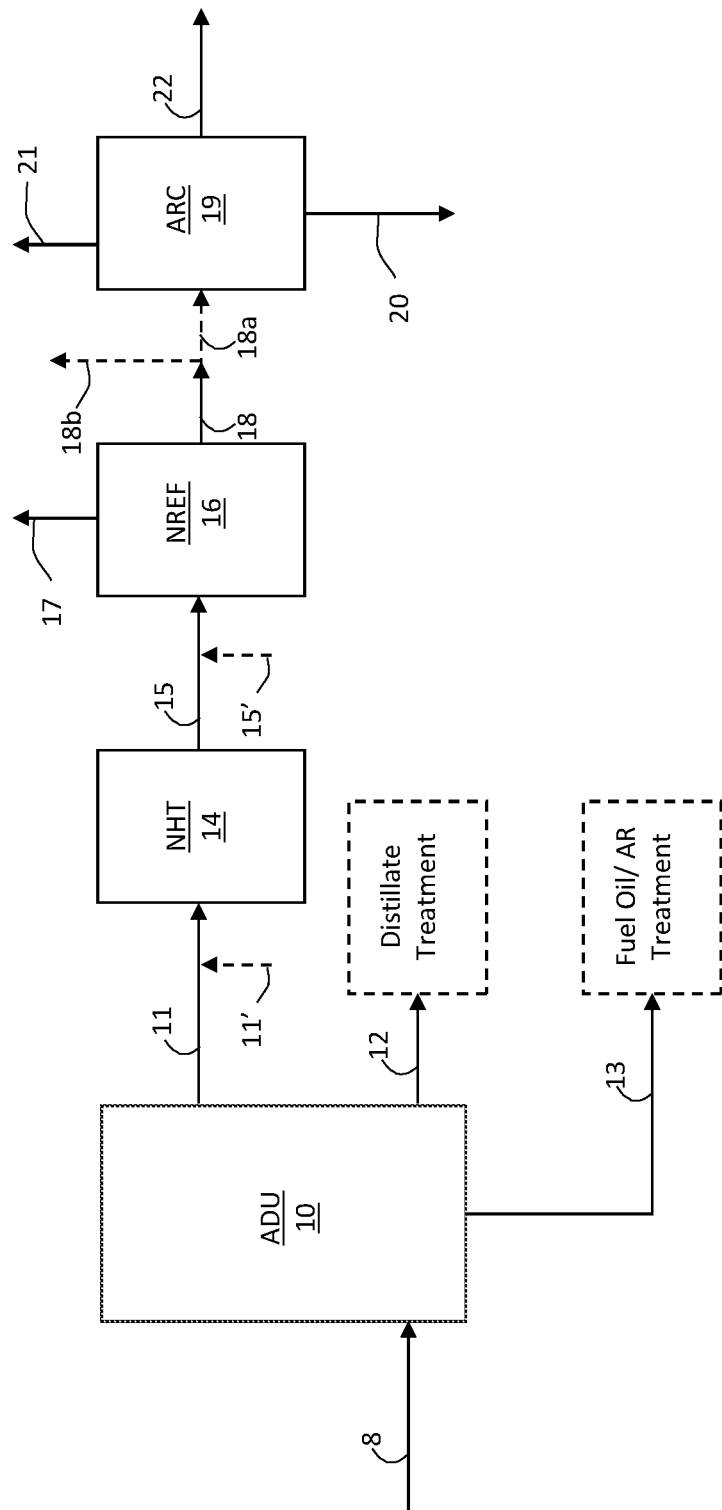
FIG. 1A is a schematic process flow diagram of a conventional system for gasoline and aromatic production.

As used herein, the term "stream" (and variations of this term, such as hydrocarbon stream, feedstream, product stream, and the like) may include one or more of various hydrocarbon compounds, such as straight chain, branched or cyclical alkanes, alkenes, alkadienes, alkynes, alkylaromatics, alkenyl aromatics, condensed and non-condensed di-, tri- and tetra-aromatics, and gases such as hydrogen and methane, $C_2+$ hydrocarbons and further may include various impurities.

The term "zone" refers to an area including one or more equipment, or one or more sub-zones. Equipment may include one or more reactors or reactor vessels, heaters, heat exchangers, pipes, pumps, compressors, and controllers. Additionally, an equipment, such as reactor, dryer, or vessels, further may be included in one or more zones.

Volume percent or "V %" refers to a relative value at conditions of 1 atmosphere pressure and 15° C.

The phrase "a major portion" with respect to a particular stream or plural streams, or content within a particular stream, means at least about 50 W % and up to 100 W %, or the same values of another specified unit.

The phrase "a significant portion" with respect to a particular stream or plural streams, or content within a particular stream, means at least about 75 W % and up to 100 W %, or the same values of another specified unit.

The phrase "a substantial portion" with respect to a particular stream or plural streams, or content within a particular stream, means at least about 90, 95, 98 or 99 W % and up to 100 W %, or the same values of another specified unit.

The phrase "a minor portion" with respect to a particular stream or plural streams, or content within a particular stream, means from about 1, 2, 4 or 10 W %, up to about 20, 30, 40 or 50 W %, or the same values of another specified unit.

The modifying term "straight run" is used herein having its well-known meaning, that is, describing fractions derived directly from the atmospheric distillation unit, optionally subjected to steam stripping, without other refinery treatment such as hydroprocessing, fluid catalytic cracking or steam cracking. An example of this is "straight run naphtha" and its acronym "SRN" which accordingly refers to "naphtha" defined herein that is derived directly from the atmospheric distillation unit, optionally subjected to steam stripping, as is well known.

The term "naphtha" as used herein refers to hydrocarbons boiling in the range of about 20-220, 20-210, 20-200, 20-190, 20-180, 20-170, 32-220, 32-210, 32-200, 32-190, 32-180, 32-170, 36-220, 36-210, 36-200, 36-190, 36-180 or 36-170° C.

The term "light naphtha" as used herein refers to hydrocarbons boiling in the range of about 20-110, 20-100, 20-90, 20-88, 32-110, 32-100, 32-90, 32-88, 36-110, 36-100, 36-90 or 36-88° C.

The term "heavy naphtha" as used herein refers to hydrocarbons boiling in the range of about 90-220, 90-210, 90-200, 90-190, 90-180, 90-170, 93-220, 93-210, 93-200, 93-190, 93-180, 93-170, 100-220, 100-210, 100-200, 100-190, 100-180, 100-170, 110-220, 110-210, 110-200, 110-190, 110-180 or 110-170° C.

The term "diesel range distillates" as used herein relative to effluents from the atmospheric distillation unit or separation unit refers to middle and heavy distillate hydrocarbons boiling between the end point of the naphtha range and the initial point of the atmospheric residue, such as in the range of about 170-370, 170-360, 170-350, 170-340, 170-320, 180-370, 180-360, 180-350, 180-340, 180-320, 190-370, 190-360, 190-350, 190-340, 190-320, 200-370, 200-360, 200-350, 200-340, 200-320, 210-370, 210-210, 210-350, 210-340, 210-320, 220-370, 220-220, 220-350, 220-340 or 220-320° C.; sub-fractions of middle and heavy distillates include kerosene, diesel and atmospheric gas oil.

The term "atmospheric residue" and its acronym "AR" as used herein refer to the bottom hydrocarbons having an initial boiling point corresponding to the end point of the diesel range distillates, and having an end point based on the characteristics of the crude oil feed.

The term "reformate" as used herein refers to a mixture of hydrocarbons that are rich in aromatics, and are intermediate products in the production of chemicals and/or gasoline, and include hydrocarbons boiling in the range of about 30-220, 40-220, 30-210, 40-210, 30-200, 40-200, 30-185, 40-185, 30-170 or 40-170° C.

The term "light reformate" as used herein refers to hydrocarbons boiling in the range of about 30-110, 30-100, 30-90, 30-88, 40-110, 40-100, 40-90 or 40-88° C.

The term "heavy reformate" as used herein refers to hydrocarbons boiling in the range of about 90-220, 90-210, 90-200, 90-190, 90-180, 90-170, 93-220, 93-210, 93-200, 93-190, 93-180, 93-170, 100-220, 100-210, 100-200, 100-190, 100-180, 100-170, 110-220, 110-210, 110-200, 110-190, 110-180 or 110-170° C.

As used herein, the term "aromatic products" includes $C_6$-$C_8$ aromatics, such as benzene, toluene, mixed xylenes (commonly referred to as BTX), or benzene, toluene, ethylbenzene and mixed xylenes (commonly referred to as BTEX), and any combination thereof. These aromatic products (referred to in combination or in the alternative as BTX/BTEX for convenience herein) have a premium chemical value.

As used herein, the terms "aromatic complex bottoms" and "aromatic bottoms" are used interchangeably and include hydrocarbons that are derived from an aromatic complex. These include the heavier fraction of $C_9$+ aromatics such as $C_9$-$C_{16}$+ compounds, and include a mixture of compounds including di-aromatics, for example in the range of $C_{10}$-$C_{16}$+ aromatic components. For example, aromatic bottoms generally boil in the range of greater than about 110 or 150° C., in certain embodiments in the range of about 110-500, 150-500, 110-450 or 150-450° C.

The term "mixed xylenes" refers to a mixture containing one or more $C_8$ aromatics, including any one of the three isomers of di-methylbenzene and ethylbenzene.

FIG. 1A is a schematic process flow diagram of a typical system and process for conversion of naphtha into gasoline and aromatic products integrating a naphtha hydrotreating zone 14, a catalytic reforming zone 16 and an aromatic complex 19. The system is shown in the context of a refinery including an atmospheric distillation column 10 having one or more outlets discharging a naphtha fraction 11 such as straight run naphtha, one or more outlets discharging diesel range distillates, shown as stream 12, and one or more outlets discharging an atmospheric residue fraction 13.

Naphtha conversion includes the naphtha hydrotreating zone 14, the catalytic reforming zone 16, and the aromatic complex 19. The naphtha hydrotreating zone 14 includes one or more inlets in fluid communication with the naphtha fraction 11 outlet(s), and one or more outlets discharging a hydrotreated naphtha stream 15. The catalytic reforming zone 16 includes one or more inlets in fluid communication with the hydrotreated naphtha stream 15 outlet(s), one or more outlets discharging a hydrogen rich gas stream 17, and one or more outlets discharging a reformate stream 18. In certain embodiments, the source of naphtha that is passed to the naphtha hydrotreating zone 14 can include a source other than the naphtha fraction 11, which in certain embodiments is straight run naphtha. Such other sources, which can be used instead of or in conjunction with the naphtha fraction 11, are generally indicated in FIG. 1A as stream 11', and can be derived from one or more sources of naphtha such as a wild naphtha stream obtained from a hydrocracking operation, a coker naphtha stream obtained from thermal cracking operations, pyrolysis gasoline obtained from steam cracking operations, or FCC naphtha. In still further embodiments, any naphtha stream that has sufficiently low heteroatom content can be passed directly to the catalytic reforming zone 16, generally indicated in FIG. 1A as stream 15'.

In certain embodiments, a portion 18b of the reformate can optionally be used directly as a gasoline blending pool component. All of stream 18, or a portion 18a in embodiments where a portion 18b is drawn off as a gasoline blending pool component, is used as feed to the aromatic complex 19. In certain embodiments, the portion 18a can be a heavy reformate fraction and the portion 18b can be a light reformate fraction. The aromatic complex 19 includes one or more inlets in fluid communication with the outlet(s) discharging the reformate stream 18 or the portion 18a thereof, and includes one or more outlets discharging gasoline pool stream(s) 21, one or more outlets discharging aromatic products stream(s) 22, and one or more outlets discharging an aromatic bottoms stream 20 that contains $C_9+$ aromatic hydrocarbon compounds.

An initial feed such as crude oil stream 8 is distilled in the atmospheric distillation column 10 to recover a naphtha or a heavy naphtha fraction 11 such as straight run naphtha or straight run heavy naphtha, and other fractions including for instance one or more diesel range distillate fractions, shown as stream 12, and an atmospheric residue fraction 13. Typically stream 12 includes at least one or more middle and/or heavy distillate fractions that are treated, such as by hydrotreating. Such treatment is referred to in FIG. 1A as "distillate treatment," and can include one or more separate hydrotreating units to desulfurize and obtain a diesel fuel fraction meeting the necessary specifications (for instance, ≤10 ppm sulfur). The atmospheric residue fraction 13 is typically either used as fuel oil component or sent to other separation and/or conversion units to convert low value hydrocarbons to high value products, shown in FIG. 1A as "fuel oil/AR treatment".

The stream(s) 11 and/or 11' are hydrotreated in the naphtha hydrotreating zone 14 in the presence of hydrogen to produce the hydrotreated stream 15. The naphtha hydrotreating zone 14 operates in the presence of an effective amount of hydrogen, which can be obtained from recycle within the naphtha hydrotreating zone 14, recycle reformer hydrogen 17 (not shown), and if necessary, make-up hydrogen (not shown). A suitable naphtha hydrotreating zone 14 can include systems based on commercially available technology. In certain embodiments the feedstream(s) 11 and/or 11' to the naphtha hydrotreating zone 14 comprises full range naphtha, and the full range of hydrotreated naphtha is passed to the catalytic reforming zone 16. In other embodiments, the feedstream(s) 11 and/or 11' to the naphtha hydrotreating zone 14 comprises heavy naphtha, and hydrotreated heavy naphtha is passed to the catalytic reforming zone 16. In further embodiments, the feedstream(s) 11 and/or 11' to the naphtha hydrotreating zone 14 comprises full range naphtha, the full range of hydrotreated naphtha is passed to a separator between the naphtha hydrotreating zone 14 and the catalytic reforming zone 16, and hydrotreated heavy naphtha is passed to the catalytic reforming zone 16.

The streams 15 and/or 15' are passed to the catalytic reforming zone 16, which operates as is known to improve its quality, that is, increase its octane number and produce a reformate stream 18. In addition, the hydrogen rich gas stream 17 is produced, all or a portion of which can optionally be used to meet the hydrogen demand of the naphtha hydrotreating zone 14 (not shown). The reformate stream 18 or a portion 18a thereof can be used as a feedstock for the aromatic complex 19. A portion 18b of stream 18 can optionally be used directly as a gasoline blending pool component, for instance 0-99, 0-95, 0-90, 0-80, 0-70, 0-60, 0-50, 0-40, 0-30, 0-20 or 0-10 V %. In the aromatic complex 19, a gasoline pool stream 21 is discharged. In certain embodiments the benzene content of the gasoline pool stream 21 is less than or equal to about 3 V % or about 1 V %. In addition, aromatic products are recovered as one or more stream(s) 22.

The naphtha hydrotreating zone 14 is operated under conditions, and utilizes catalyst(s), effective for removal of a significant amount of the sulfur and other known contaminants. Accordingly, the naphtha hydrotreating zone 14 subjects feed to hydrotreating conditions to produce a hydrotreated naphtha or hydrotreated heavy naphtha stream 15 effective as feed to the catalytic reforming zone 16. The naphtha hydrotreating zone 14 operates under conditions of, for example, temperature, pressure, hydrogen partial pressure, liquid hourly space velocity (LHSV), catalyst selection/loading that are effective to remove at least enough sulfur, nitrogen, olefins and other contaminants needed to meet requisite product specifications. For example, the naphtha hydrotreating zone 14 can be operated under conditions effective to produce a naphtha range stream that meets requisite product specifications regarding sulfur and nitrogen levels, for instance, a level of ≤0.5 ppmw, as is conventionally known. Effective naphtha hydrotreating reactor catalysts include those possessing hydrotreating functionality and which generally contain one or more active metal component of metals or metal compounds (oxides or sulfides) selected from the Periodic Table of the Elements IUPAC Groups 6-10. In certain embodiments, the active metal component is selected from the group consisting of Co, Ni, Mo, and combinations thereof. The catalyst used in the naphtha hydrotreating zone 14 can include one or more catalyst selected from Co/Mo, Ni/Mo and Co/Ni/Mo. Combinations of one or more of Co/Mo, Ni/Mo and Co/Ni/Mo, can also be used. In certain embodiments, Co/Mo hydrodesulfurization catalyst is suitable. The active metal component is typically deposited or otherwise incorporated on a support, such as amorphous or crystalline alumina, silica alumina, titania, zeolites, or combinations thereof. The combinations can be composed of different particles containing a single active metal species, or particles containing multiple active species.

The hydrotreated naphtha stream is treated in the catalytic reforming zone 16 to produce reformate 18. A suitable catalytic reforming zone 16 can include systems based on commercially available technology. In certain embodiments, all, a substantial portion or a significant portion of the hydrotreated naphtha stream 15 is passed to the catalytic reforming zone 16, and any remainder can be blended in a gasoline pool. Typically, within the catalytic reforming zone 16, reactor effluent, containing hot reformate and hydrogen, is cooled and passed to a separator for recovery of a hydrogen stream and a separator bottoms stream the hydrogen is split into a portion that is compressed and recycled within the reformer reactors, and an excess hydrogen stream 17. The separator bottoms stream is passed to a stabilizer column to produce a light end stream and a reformate stream. The light end stream can be recovered and combined with one or more other similar streams obtained in the refinery. The hydrogen stream 17 can be recovered and passed to other hydrogen users within the refinery, including the naphtha hydrotreating zone 14.

In general, operating conditions for reactor(s) in the catalytic reforming zone 16 include a temperature in the range of from about 400-560 or 450-560° C.; a pressure in the range of from about 1-50 or 1-20 bars; and a liquid hourly space velocity in the range of from about 0.5-10, 0.5-4, or 0.5-2 $h^{-1}$. The reformate is sent to the gasoline pool to be blended with other gasoline components to meet the required specifications. Cyclic and CCR process designs include online catalyst regeneration or replacement, and accordingly the lower pressure ranges as indicated above are suitable. For instance, CCRs can operate in the range of about 5 bar, while semi regenerative systems operate at the higher end of the above ranges, with cyclic designs typically operating at a pressure higher than CCRs and lower than semi regenerative systems.

An effective quantity of reforming catalyst is provided. Such catalysts include mono-functional or bi-functional reforming catalysts which generally contain one or more active metal component of metals or metal compounds (oxides or sulfides) selected from the Periodic Table of the Elements IUPAC Groups 8-10. A bi-functional catalyst has both metal sites and acidic sites. In certain embodiments, the active metal component can include one or more of Pt, Re, Au, Pd, Ge, Ni, Ag, Sn, Ir or halides. The active metal component is typically deposited or otherwise incorporated on a support, such as amorphous or crystalline alumina, silica alumina, titania, zeolites, or combinations thereof. In certain embodiments, Pt or Pt-alloy active metal components that are supported on alumina, silica or silica-alumina are effective as reforming catalyst. The hydrocarbon/naphtha feed composition, the impurities present therein, and the desired products will determine such process parameters as choice of catalyst(s), process type, and the like. Types of chemical reactions can be targeted by a selection of catalysts or operating conditions known to those of ordinary skill in the art to influence both the yield and selectivity of conversion of paraffinic and naphthenic hydrocarbon precursors to particular aromatic hydrocarbon structures.

Figure 1B:
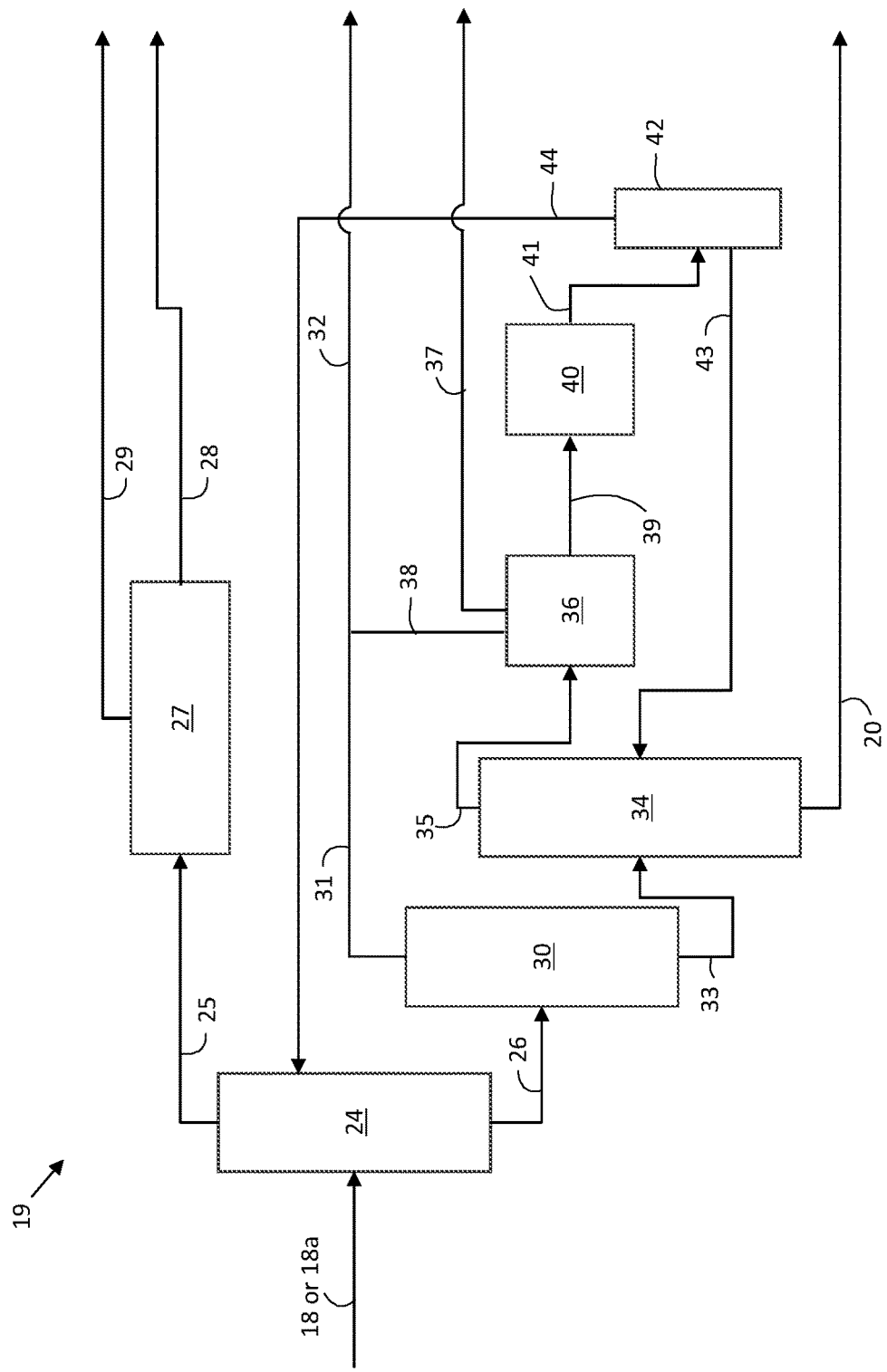
FIG. 1B is a schematic process flow diagram of a conventional aromatics recovery complex.

FIG. 1B is a schematic process flow diagram of a typical aromatic complex 19. The reformate stream 18 or a portion, stream 18a, is passed to the aromatic complex 19 to extract and separate the aromatic products, such as benzene and mixed xylenes, which have a premium chemical value, and to produce an aromatics and benzene free gasoline blending component. The aromatic complex produces a heavier fraction of $C_9+$ aromatics, stream 20, which is not suitable as a gasoline blending component stream.

In the aromatic complex described in conjunction with FIG. 1B, toluene may be included in the gasoline cut, but other embodiments are well known in which toluene is separated and/or further processed to produce other desirable products. For instance, toluene along with $C_9+$ hydrocarbon compounds can be subjected to transalkylation to produce ethylbenzene and mixed xylenes, as disclosed in U.S. Pat. No. 6,958,425, which is incorporated herein by reference.

A reformate stream 18 or portion 18a from the catalytic reforming unit 16 is divided into a light reformate stream 25 and a heavy reformate stream 26 in a reformate splitter 24. The light reformate stream 25, containing $C_5/C_6$ hydrocarbons, is sent to a benzene extraction unit 27 to extract a benzene product stream 28 and to recover a gasoline component stream 29 containing non-aromatic $C_5/C_6$ compounds, raffinate motor gasoline, in certain embodiments which is substantially free of benzene. The heavy reformate stream 26, containing $C_7+$ hydrocarbons, is routed to a heavy reformate splitter 30, to recover a $C_7$ component 31 that forms part of a $C_7$ gasoline product stream 32, and a $C_8+$ hydrocarbon stream 33.

The $C_8+$ hydrocarbon stream 33 is routed to a xylene rerun unit 34, where it is separated into a $C_8$ hydrocarbon stream 35 and a heavier $C_9+$ aromatic hydrocarbon stream 20 (for instance which corresponds to the aromatic bottoms stream/$C_9+$ hydrocarbon stream 20 described in FIG. 1A). The $C_8$ hydrocarbon stream 35 is routed to a para-xylene extraction unit 36 to recover a para-xylene product stream 37. Para-xylene extraction unit 36 also produces a $C_7$ cut mogas stream 38, which can be combined with $C_7$ cut mogas stream 31 to produce the $C_7$ cut mogas stream 32. A stream 39 of other xylenes (that is, ortho- and meta-xylenes) is recovered and sent to a xylene isomerization unit 40 to produce additional para-xylene, and an isomerization effluent stream 41 is sent to a splitter column 42. A $C_8+$ hydrocarbon stream 43 is recycled back to the para-xylene extraction unit 36 from the splitter column 42 via the xylene rerun unit 34. Splitter tops, $C_7-$ hydrocarbon stream 44, is recycled back to the reformate splitter 24. The heavy fraction 20 from the xylene rerun unit 34 is the aromatic bottoms stream that is conventionally recovered as process reject, corresponding to stream 20 in FIG. 1A. In certain embodiments, the streams 29 and 32 form the gasoline pool stream 21 as in FIG. 1A, and streams 28 and 37 form the aromatic products streams 22.

Figure 1C:
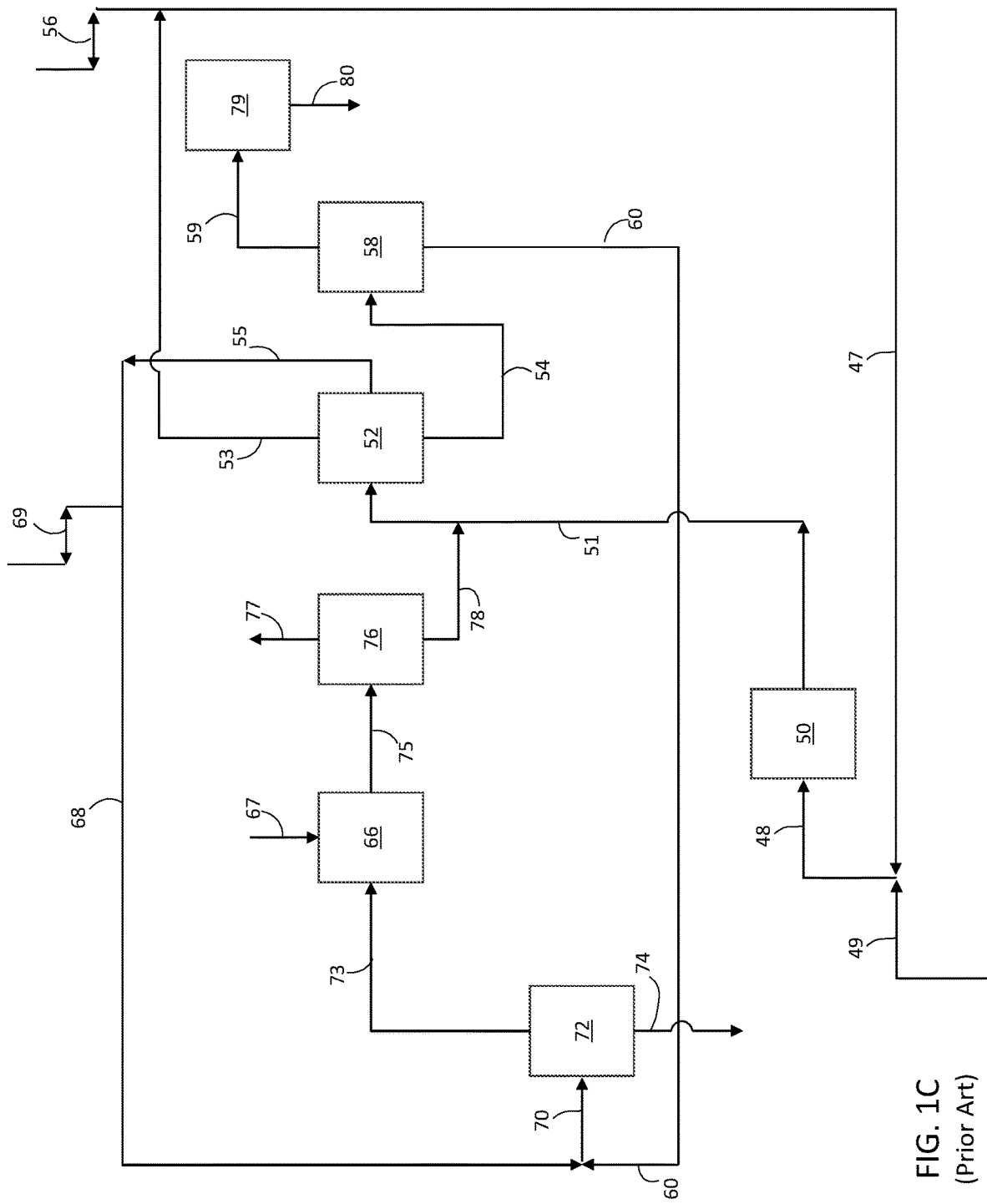
FIG. 1C is a schematic process flow diagram of a conventional system for aromatic transalkylation.

FIG. 1C is a schematic process flow diagram of a transalkylation/toluene disproportionation zone for aromatic transalkylation of $C_9+$ aromatics into $C_8$ aromatics ethylbenzene and xylenes, for instance similar to that disclosed in U.S. Pat. No. 6,958,425. In general, the units of the transalkylation/toluene disproportionation zone operate under conditions and in the presence of catalyst(s) effective to disproportionate toluene and $C_9+$ aromatics. Benzene and/or toluene can be supplied from the integrated system and processed herein or externally as needed. While an example of a transalkylation/toluene disproportionation zone is show in FIG. 1C, it is understood that other processes can be used and integrated within the system and process herein for catalytic conversion of aromatic complex bottoms.

A $C_9+$ alkylaromatics feedstream 49 for transalkylation can be all or a portion of stream 20 from the aromatic complex (for instance from the xylene rerun unit). In certain embodiments the stream 49 can be a tops fraction 96 as shown and described in conjunction with FIG. 2A described herein. In additional embodiments, stream 49 can include all or a portion of products from an aromatic complex bottoms treatment zone, such as stream 92 and/or 92a described below, for instance after removal of gases. In the process, a $C_9+$ alkylaromatics stream 49 is admixed with a benzene stream 47 to form a combined stream 48 as the feed to a first transalkylation reactor 50 (optionally also including an additional hydrogen stream). After contact with a suitable transalkylation catalyst such as a zeolite material, a first transalkylation effluent stream 51 is produced and passed to a first separation column 52. The separation column 52, which also receives a second transalkylation effluent stream 78, separates the combined stream into an overhead benzene stream 53; a $C_{8+}$ aromatics bottoms stream 54 including ethylbenzene and xylenes; and a side-cut toluene stream 55. The overhead benzene stream 53 is recycled back to the transalkylation reactor 50 via stream 47 after benzene is removed or added, shown as stream 56. In certain embodiments added benzene includes stream 28 from the aromatic complex in FIG. 1B. The $C_{8+}$ aromatics bottoms stream 54 is passed to a second separation column 58 from which an overhead stream 59 containing ethylbenzene and xylenes is directed to a para-xylene unit 79 to produce a para-xylene stream 80. In certain embodiments the para-xylene unit 79 can operate similar to the para-xylene extraction unit 36, the xylene isomerization unit 40, or both the para-xylene extraction unit 36, the xylene isomerization unit 40. In further embodiments the para-xylene unit 79 be the para-xylene extraction unit 36, the xylene isomerization unit 40, or both the para-xylene extraction unit 36.

A bottoms C9+ alkylaromatics stream 60 is withdrawn from the second separation column 58. The side-cut toluene stream 55 is ultimately passed to a second transalkylation unit 66 via stream 68 after toluene is added or removed, shown as stream 69. In certain embodiments added toluene includes all or a portion of the $C_7$ streams 31 or 38, or the combined stream 32, from the aromatic complex in FIG. 1B. The toluene stream 68 is admixed with the bottoms C9+ alkylaromatics stream 60 to form a combined stream 70 that enters a third separation column 72. The separation column 72 separates the combined stream 70 into a bottoms stream 74 of $C_{11}+$ alkylaromatics ("heavies"), and an overhead stream 73 of $C_9$, $C_{10}$ alkylaromatics, and lighter compounds (including $C_7$ alkylaromatics). The overhead stream 73 is directed to a second transalkylation unit 66, along with a hydrogen stream 67. After contact with a transalkylation catalyst, a second transalkylation effluent stream 75 is directed to a stabilizer column 76 from which an overhead stream 77 of light end hydrocarbons ("light-ends gas", generally comprising at least ethane) is recovered, and a bottom stream 78 of the second transalkylation product is directed to the first separation column 52. All, a major portion, a significant portion or a substantial portion of the bottoms stream 74 of $C_{11}+$ alkylaromatics can be passed to an aromatic complex bottoms treatment zone 81 shown and described in conjunction with FIGS. 2A and 2B described herein.

The bottoms fraction 20 from the aromatic complex 19 is subjected to additional processing steps, and in certain embodiments separation and processing steps, to recover additional aromatic products and/or gasoline blending material. For instance, all or a portion of the $C_9+$ heavy fraction 20 from the xylene re-run unit 34 is converted. In additional embodiments in which transalkylation is incorporated, all or a portion of a bottoms stream 74 of $C_{11}+$ alkylaromatics from the separation column 72 can be processed to recover additional aromatic products and/or gasoline blending material. While FIGS. 1A-1B, and optionally FIGS. 1A-1B in combination with FIG. 1C, show embodiments of conventional systems and processes for reforming and separation of aromatic products and gasoline products, $C_9+$ heavy fractions derived from other reforming and separation processes can be suitable as feeds in the systems and processes described herein, for instance, pyrolysis gasoline from steam cracking having condensed aromatics such as naphthalenes.

Characterizations of aromatic complex bottoms show that $C_9+$ mixtures include for example about 75-94 W % of mono-aromatics, about 4-16 W % of di, tri and tetra-aromatics, and about 2-8 W % of other components containing an aromatic ring. The two-plus ring aromatics include alkyl-bridged non-condensed di-aromatics (1), for instance 55-75, 60-70 or 65 W %, and condensed diaromatics (2) as shown below. For the $C_{11}+$ heavy fractions of aromatic complex bottoms, the mixtures include, for example, about 9-15 W % of mono-aromatics, about 68-73 W % of di, tri and tetra-aromatics, and about 12-18 W % of other components containing an aromatic ring.

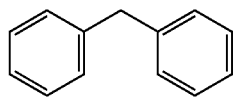

(diphenyl methane)

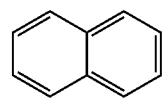

(naphthalene)

Non-condensed diaromatic rings, connected by an alkyl bridge, are commonly formed in the clay treating step prior to the pare-xylene units of the aromatic recovery complex to remove olefins and diolefins. The clay treating process utilizes a clay, which has Lewis acid sites that acts as a catalyst at temperatures of about 200° C. In the process, olefinic molecules such as alkenyl aromatics react with alkylaromatics via a Friedel-Crafts reaction to form molecules having two aromatic rings connected by an alkyl bridge as shown below, (3). In this reaction, styrene reacts with benzene to form diphenylmethane, which is a non-condensed diaromatic molecule:

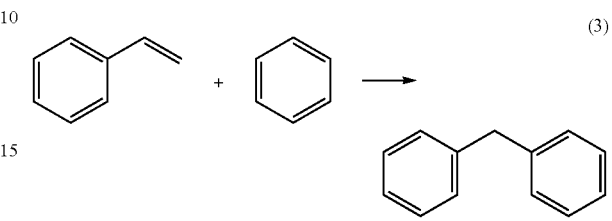

In addition to the alkylation reaction, it was reported that butyl benzene can be converted to naphthalene, a condensed diaromatic, through cyclization reactions, (4) (Kari Vahteristo Ph.D. Thesis entitled "Kinetic modeling of mechanisms of industrially important organic reactions in gas and liquid phase, University of Technology, Lappeenranta, Finland, Nov. 26, 2010).

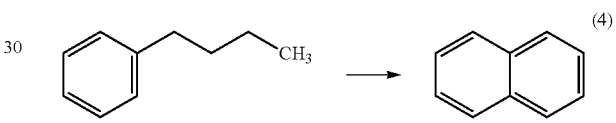

Formation of condensed diaromatics after the clay treaters was also observed. The diaromatic compounds have properties that are not suitable for gasoline blending components. For example, diphenylmethane has a density of 1.01 Kg/L, brown color (Standard Reference Method Color greater than 20), and a boiling point of 264° C. Similarly, naphthalene has a density of 1.14 Kg/L, and a boiling point of 218° C. These properties are not suitable as gasoline blending components.

In a typical refining operation, these multi-aromatics are usually separated from the unreacted alkylaromatics by fractionation, with at least one low-boiling point (or light) fraction containing reduced levels of olefins and at least one high-boiling point (or heavy) fraction containing the multi-aromatics along with high boiling point alkylaromatics. The heavy fraction containing the multi ring-aromatics may be utilized as a stream for gasoline blending because it has a relatively high octane, however the high density, color and boiling point, limit its portion of the blend to relatively low fractions. Where the heavy fraction containing the multi-aromatics is not sent for gasoline blending, it is typically utilized as fuel oil.

The heavy fraction containing the multi ring-aromatics is typically not processed in catalytic units such as a toluene/C9/C10 transalkylation unit, as associated condensed multi-aromatics in the heaviest fractions with greater than 10 carbon atoms tend to form catalyst-deactivating coke layers at the conditions used in such systems, limiting catalyst life between regenerations. Conversion of multi-aromatics into alkylaromatics retains their high octane for gasoline blending, while greatly improving the density, color and boiling point properties. Conversion of the multi-aromatics into alkylaromatics allows for their use as feedstock within BTX/BTEX petrochemicals units directly, or as feedstock to a toluene/C9/C10 transalkylation unit for the fraction of the produced alkylaromatics with carbon numbers greater than C8. Table 1 shows properties and composition of a bottoms stream obtained from an aromatic recovery complex, both where a transalkylation unit is not installed, and where a transalkylation unit is installed. When a transalkylation unit is used, the aromatic bottoms stream was found to have only 15 W % of mono-aromatics and 63 W % diaromatics.

TABLE 1

| Property | | Feedstock - Aromatic Bottoms (no TA) | Tops Gasoline - IBP - 180° C. | Bottoms Distillate - 180° C.+ | Feedstock - Aromatic Bottoms (TA) |
|---|---|---|---|---|---|
| Density | g/cc | 0.8838 | 0.8762 | 0.9181 | 0.9819 |
| Octane Number (ASTM D2799) | | — | 110 | — | — |
| Cetane Index | | — | — | 12 | — |
| IBP | ° C. | 153 | 67 | 167 | 198 |
| 5 W % | ° C. | 162 | 73 | 176 | 207 |
| 10 W % | ° C. | 163 | 73 | 181 | 211 |
| 30 W % | ° C. | 167 | 76 | 192 | 236 |
| 50 W % | ° C. | 172 | 77 | 199 | 275 |
| 70 W % | ° C. | 176 | 79 | 209 | 303 |
| 90 W % | ° C. | 191 | 81 | 317 | 332 |
| 95 W % | ° C. | 207 | 81 | 333 | 351 |
| FBP | ° C. | 333 | 83 | 422 | 445 |
| Paraffins/naphthenes | W % | 0 | — | — | 0.4 |
| Mono-aromatics | W % | 94.1 | — | — | 15.2 |
| Naphthenic mono-aromatics | W % | 0.9 | — | — | 9.4 |
| Di-aromatics | W % | 3.7 | — | — | 61.3 |
| Naphthenic di-aromatics | W % | 0.9 | — | — | 7.5 |
| Tri+ Aromatics | W % | 0.3 | — | — | 4.5 |

As noted herein, the feed 20 to an aromatic complex bottoms treatment zone 81 can be an aromatic complex bottoms stream or a heavy portion thereof. In certain embodiments the feed to the aromatic complex bottoms treatment zone 81 is undiluted by a solvent. Such feeds can include, single-ring aromatics with at least three additional carbon atoms (for example one 3 carbon alkyl group, three 1 carbon alkyl groups, one 2 carbon alkyl group and one 1 carbon alkyl group, or combinations thereof). In certain embodiments the feed 20 can include a major portion, a significant portion or a substantial portion of such single-ring aromatics with one or more alkyl groups containing three carbon atoms. In addition, the feed 20 can include alkyl bridged non-condensed alkyl multi-aromatic compounds. In certain embodiments the alkyl bridged non-condensed alkylaromatic compounds include at least two benzene rings connected by an alkyl bridge group having at least two carbons, where the benzene rings are connected to different carbons of the alkyl bridge group. In certain embodiments, the alkyl bridged non-condensed alkylaromatic compounds include additional alkyl groups connected to the benzene rings of the alkyl bridged non-condensed alkylaromatic compounds. In certain embodiments, all or a portion of the $C_9+$ heavy fraction 20 from the xylene re-run unit 34 is the feed to the aromatic complex bottoms treatment zone 81. For example, various alkyl bridged non-condensed alkylaromatic compounds may include a mixture of chemical compounds illustrated by formulas (5) (minimum carbon number of 16), (6), (7), and combinations of these compounds.

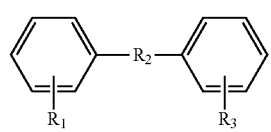

(5)

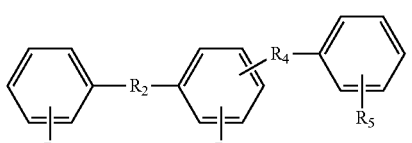

(6)

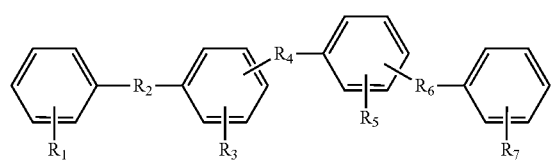

(7)

where: $R_2$, $R_4$, and $R_6$ are alkyl bridge groups independently having from two to six carbon atoms; $R_1$, $R_3$, $R_5$, and $R_7$ are independently selected from the group consisting of hydrogen and an alkyl group having from one to eight carbon atoms. In addition to the groups $R_1$, $R_3$, $R_5$, and $R_7$, the benzene groups of formulas (5), (6), and (7) may further include additional alkyl groups connected to the benzene groups, respectively. The total carbon number for non-condensed alkylaromatic compounds of the formula (5) herein is at least 16. In addition to the four benzene groups of formula (7), the various alkyl bridged non-condensed alkylaromatic compounds may include five or more benzene groups connected by alkyl bridges, where the additional benzene groups further may include alkyl groups connected to the additional benzene groups.

Figure 2A:
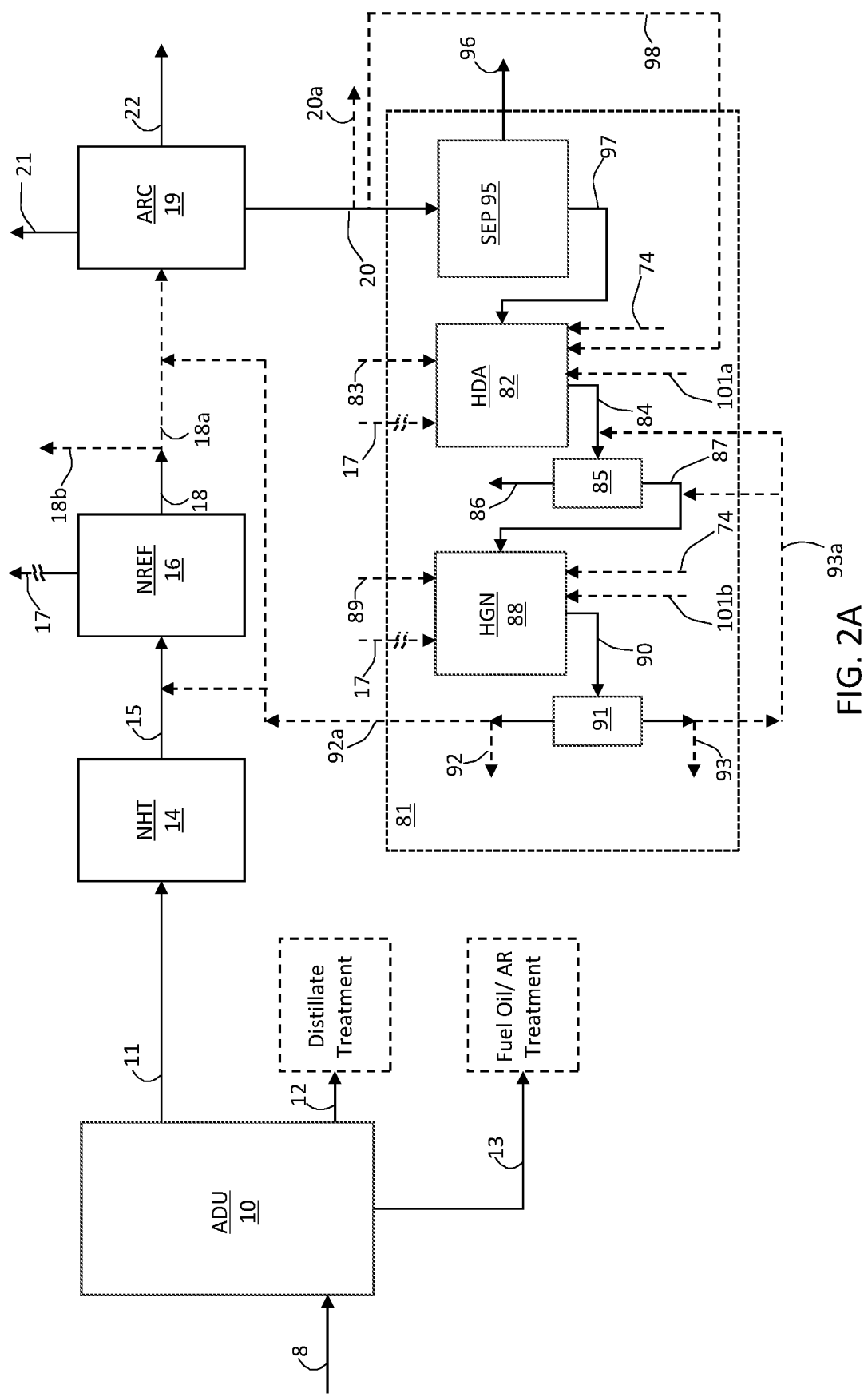
FIG. 2A is a schematic process flow diagram of an embodiment of a system in which aromatic bottoms are separated and passed to a hydrodearylation zone and a hydrogenation zone.

FIG. 2A schematically shows units and operations similar to FIG. 1A upstream of the aromatic complex 19, using like reference numerals for like units or streams. FIG. 2A is a schematic process flow diagram of a refinery including conversion of naphtha into gasoline and aromatic products. The refinery includes units similar to those described with respect to FIG. 1A: an atmospheric distillation column 10, a naphtha hydrotreating zone 14 and a catalytic reforming zone 16. The aromatic complex 19 is also included that produces the gasoline pool stream(s) 21, the aromatic products stream(s) 22, and the aromatic complex bottoms stream 20. In certain embodiments, a portion of stream 20, shown as stream 20a (in dashed lines), is diverted. A separation zone 95 is provided having one or more inlets in fluid communication with the aromatic bottoms stream 20 outlet (s), one or more outlets for discharging a tops stream 96, and one or more outlets for discharging a bottoms stream 97. The separation zone 95 can include a distillation column (for example having 5 or more theoretical trays), a flash unit and/or a stripper. The aromatic complex bottoms treatment zone 81 is provided to utilize and convert a portion of the aromatic complex bottoms stream 20, bottoms stream 97, into additional fuel and/or petrochemical products or blending components.

In certain embodiments the quantity, quality and nature of the tops fraction 96 is such that it can be used as gasoline blending components without further treatment, and separation is carried out accordingly. In certain embodiments, the tops stream 96 contains hydrocarbons boiling in the naphtha/naphtha range, and the bottoms stream 97 contains hydrocarbons boiling above the naphtha range. In certain embodiments, the tops stream 96 contains $C_9$ components, and the bottoms stream 97 containing $C_{10}+$ components. In certain embodiments, the tops stream 96 contains $C_9$ and $C_{10}$ components, and the bottoms stream 97 contains $C_{11}+$ components. In certain embodiments, the tops stream 96 contains about 50-99 wt. % of the $C_9$ and $C_{10}$ compounds. In another embodiment, the tops stream 96 contains about 60-99 wt. % of the $C_9$ and $C_{10}$ compounds. In an embodiment, the tops stream 96 contains about 80-99 wt. % of the $C_9$ and $C_{10}$ compounds. In certain embodiments the tops fraction comprises naphtha range hydrocarbons and the bottoms fraction comprises diesel range hydrocarbons. In certain embodiments the tops fraction comprises one or more gasoline fractions and the bottoms fraction comprises hydrocarbons boiling above the gasoline fractions. The bottoms stream 97 is in fluid communication with the aromatic complex bottoms treatment zone 81. In optional embodiments, or on an as-needed basis, aromatic bottoms stream 20 outlet(s) can be in direct fluid communication with the aromatic complex bottoms treatment zone 81 via a slipstream 98 (shown in dashed lines).

All, a major portion, a significant portion or a substantial portion of the heavy aromatic complex $C_9+$ bottoms stream 20 from the aromatic complex containing alkylaromatics (for instance from the xylene rerun unit) is passed to the separation zone 95 for separation into the tops stream 96 containing hydrocarbons boiling in the naphtha/naphtha range and containing C9 and C10 components, and the bottoms stream 97 containing hydrocarbons boiling above the naphtha range, such as diesel range distillates, and containing $C_{11}+$ components. All, a major portion, a significant portion or a substantial portion of the bottoms stream 97 is routed to the aromatic complex bottoms treatment zone 81. In certain embodiments, or on an as-needed basis, and as shown in dashed lines, a slipstream 98 which is a portion of the aromatic complex bottoms stream 20 is routed directly to the aromatic complex bottoms treatment zone 81. For instance, portion 98 of stream 20 can be in the range of about 0-100, 0-99, 0-95, 0-90, 0-80, 0-70, 0-60, 0-50, 0-40, 0-30, 0-20 or 0-10 V %. Factors that contribute to use and/or quantity of the slipstream 98 include whether the bottoms fraction is $C_{11}+$, for instance when aromatic transalkylation is integrated, gasoline market supply and demand considerations, and the usable gasoline content of stream 20.

Figure 2B:
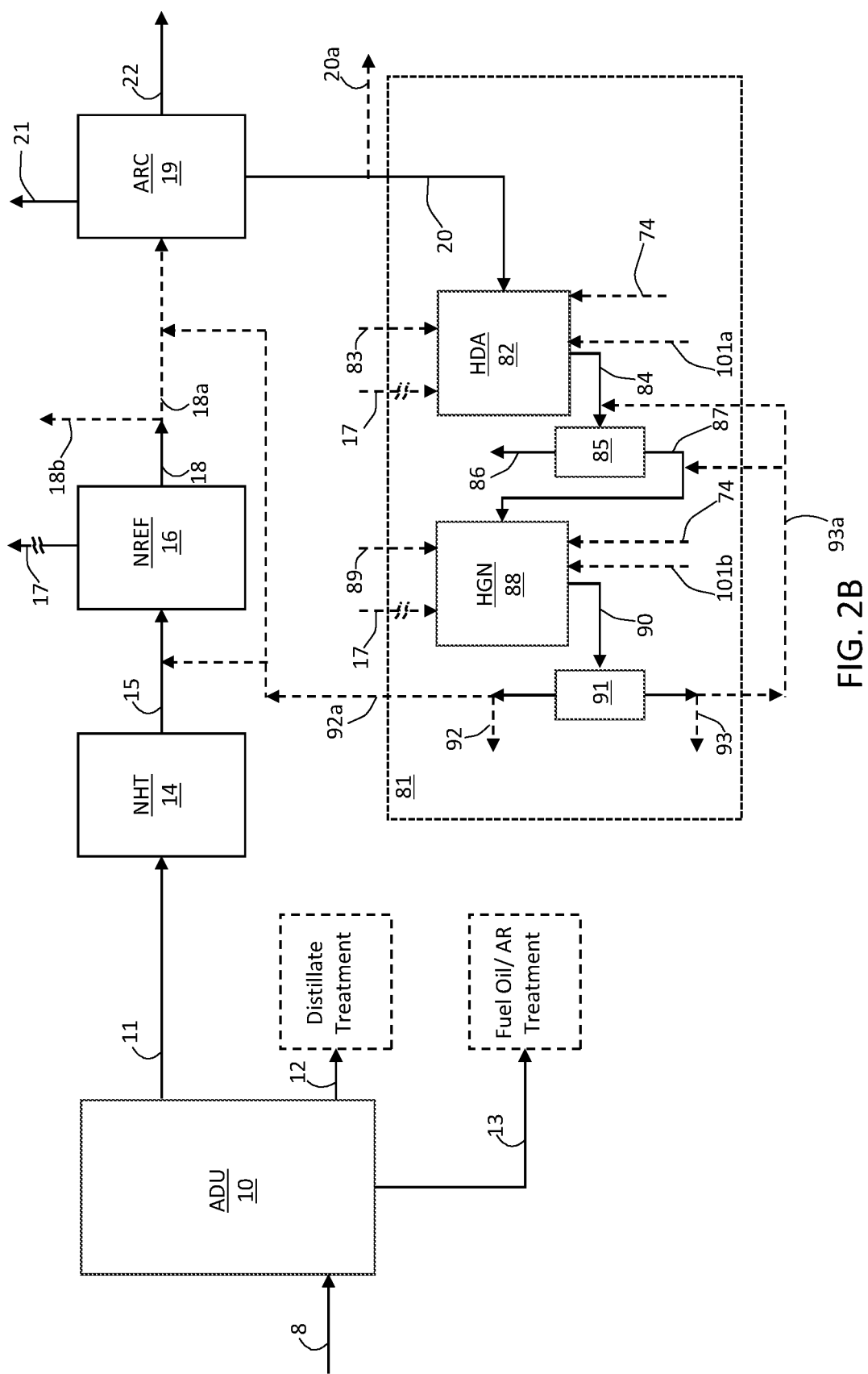
FIG. 2B is a schematic process flow diagram of an embodiment of a system in which aromatic bottoms are passed to a hydrodearylation zone and a hydrogenation zone.

With reference to FIG. 2B, units and operations similar to FIG. 1A upstream of the aromatic complex 19 are shown, using like reference numerals for like units. FIG. 2B is a schematic process flow diagram of a refinery including conversion of naphtha into gasoline and aromatic products. The refinery includes units similar to those described with respect to FIG. 1A: an atmospheric distillation column 10, a naphtha hydrotreating zone 14 and a catalytic reforming zone 16. The aromatic complex 19 is also included that produces the gasoline pool stream(s) 21, the aromatic products stream(s) 22, and the aromatic complex bottoms stream 20. In certain embodiments, a portion of stream 20, shown as stream 20a (in dashed lines), is diverted. An aromatic complex bottoms treatment zone 81 is provided to utilize and convert all or a portion of the aromatic complex bottoms stream 20, into additional fuel and/or petrochemical products or blending components. In certain embodiments, all, a major portion, a significant portion or a substantial portion of the aromatic bottoms stream 20 from the aromatic complex containing $C_9+$ alkylaromatics (for instance from the xylene rerun unit) is passed directly to the aromatic complex bottoms treatment zone 81.

In certain embodiments the aromatic complex bottoms treatment zone 81 is also in fluid communication with a source of one or more additional feedstream(s) 101a and/or 101b (as shown in both FIGS. 2A and 2B in dashed lines). For example, the additional feedstream(s) 101a and/or 101b can comprise one or more feedstocks selected from the group consisting of vacuum gas oil, demetallized oil and/or hydrocracker bottoms, and atmospheric residue. These feeds can be passed to the aromatic complex bottoms treatment zone 81 directly, or in certain embodiments can be subjected to hydrotreating. In certain embodiments, for example when a transalkylation and disproportionation zone as in FIG. 1C or similar thereto is used, the aromatic complex bottoms treatment zone 81 is also in fluid communication with a heavies stream 74 (as shown in both FIGS. 2A and 2B in dashed lines).

Treating the bottoms stream from an aromatic complex comprises a multi-step process, including hydrodealkylation and hydrogenation. In the present processes and systems, aromatic bottoms stream(s) from the aromatic complex containing $C_9+$ alkylaromatics (for instance from a xylene rerun column) and/or $C_{11}+$ aromatics (for instance a bottoms stream from a transalkylation separator), typically considered relatively low-value effluents, are subjected to catalytic hydrodearylation followed by catalytic hydrogenation. The hydrogenation effluent has, relative to the aromatic bottoms stream or heavy portion thereof, an increased concentration of naphthenes, paraffins and mono-aromatics, and a decreased concentration of problematic condensed and non-condensed di-aromatics. All or various portions of the hydrogenation effluent stream can be used for fuel and/or petrochemical production. This hydrogenation effluent stream can be recycled back to the reforming unit for dehydrogenation of dealkylated rings to produce BTX and gasoline blending components. Any bottoms products containing naphthenes and aromatics in minor proportion can be recycled within the aromatic complex bottoms treatment zone 81, utilized as fuel oil, directed to one or more hydroprocessing units within the refinery (for instance in combination with streams 12 and/or 13 to enhance production of additional diesel, jet fuel and/or kerosene), and/or directed to a diesel or jet/kerosene pool as a blending component. In certain embodiments the gasoline blending pool contribution is increased according to the process herein.

A hydrodearylation (HDA) unit is in fluid communication with the aromatic complex bottoms stream, directly or with an intermediate separator, wherein the HDA unit is operable for hydrodearylation of the aromatic complex bottoms and/or diesel range hydrocarbons derived from the aromatic complex bottoms, and/or a heavy portion thereof, to break the bridge of the alkyl-bridged, non-condensed multi-aromatics. Heavy products from the hydrodearylation reaction effluents containing condensed diaromatics are passed to a hydrogenation (HGN) unit, wherein the condensed diaromatics are partially hydrogenated, and the naphthenic bonds are cracked, to recover mono-aromatics. In addition, aromatics are converted into naphthenes.

Hydrodearylation processes are known for the cleaving of the alkyl bridge of non-condensed, alkyl-bridged multi-aromatics or heavy alkylaromatic compounds to form alkyl mono-aromatics, in the presence of a catalyst and hydrogen. For example, U.S. Pat. Nos. 10,053,401 and 10,093,873 disclose passing an aromatics bottoms stream from, for instance, a xylene rerun column of an aromatic complex, to a hydrodearylation unit, despite conventionally limited use as gasoline blending components because of its dark color, high density and high boiling point. Hydrodearylation allows for processing of this low-value stream at relatively mild conditions to yield a higher composition of mono-aromatics and a lower composition of the problematic di-aromatics.

Hydrogenation processes are known in the petroleum industry to convert aromatic rich petroleum streams into naphthenes, which have desirable fuel properties such as smoke point for jet fuel, cetane number for diesel, and the like. Hydrogenation is typically performed at moderately high hydrogen partial pressure over a non-noble metal catalyst such as Ni, Mo or a combination thereof; or for deep hydrogenation, a noble metal catalyst such as Pt, Pd or a combination thereof. Noble base catalysts plus acidic catalysts such as zeolite-containing catalysts enhance the hydrogen transfer reactions during alkylaromatic dealkylation.

In the present processes and systems, aromatic bottoms stream(s) from the aromatic complex, typically considered relatively low-value effluents, are subjected to an integrated process including a hydrodearylation operation and a hydrogenation operation. Hydrogenation product(s) can be recovered as product or intermediate product for fuel production or petrochemical production, and/or recycled back to the reforming unit as gasoline blending components to further improve gasoline volume and quality. In addition, a heavy portion of the hydrogenation effluents can be recycled within the aromatic complex bottoms treatment zone 81, utilized as fuel oil, directed to one or more hydroprocessing units within the refinery (for instance in combination with streams 12 and/or 13 to enhance production of additional diesel, jet fuel and/or kerosene), and/or directed to a diesel or jet/kerosene pool as a blending component.

The aromatic complex bottoms treatment zone 81 as shown in both FIGS. 2A and 2B includes an HDA zone 82, an HDA effluent separation zone 85, an HGN zone 88 and an HGN effluent separation zone 91. In general, the series of the HDA zone and the HGN zone units are operable crack diaromatics and to crack alkylaromatics for conversion into one or more additional product streams including: from the HDA zone 82, a tops stream 86; and from the HGN zone 88, a hydrogenation effluent stream 92 and/or 92a. These additional product streams are utilized to recover BTX/BTEX products and/or suitable gasoline blending components, and other valuable products. In certain embodiments, the hydrocarbon feedstock aromatic complex bottoms treatment zone 81 comprises all or a portion of the aromatic complex bottoms stream that is undiluted by a solvent. The conversion includes hydrodearylation to break the bridge between the rings of alkyl-bridged, non-condensed multi-aromatics, breaking the alkyl chains in single ring mono alkylaromatics to produce aromatic products, and ring opening of alkylated mono-naphthenes. The process allows for production of additional aromatic products and/or gasoline blending pool components.

The HDA zone 82 includes one or more reactors operable to treat all or a portion of the aromatic complex bottoms stream by hydrodearylation. In general, the HDA zone 82 includes one or more outlets for discharging an effluent stream 84 containing hydrodearylated hydrocarbons. The reactor(s) include one or more inlets in fluid communication, via a separator or directly, with the aromatic complex bottoms stream. In the embodiment of FIG. 2A the reactor(s) include one or more inlets in fluid communication with the bottoms stream 97 from the separation zone 95 and optionally a slipstream 98 obtained from the bottoms fraction(s) 20. In the embodiment of FIG. 2B the reactor(s) include one or more inlets in fluid communication with the aromatic bottoms stream 20. In certain embodiments the HDA zone 82 is also in fluid communication with a source of an additional feedstream 101a as indicated by dashed lines. In additional embodiments in which transalkylation is incorporated, all or a portion of a bottoms stream 74 of $C_{11}+$ alkylaromatics from the separation column 72 is in fluid communication with the HDA zone 82. The HDA zone 82 is in fluid communication with one or more sources of hydrogen including recycled hydrogen from the HDA zone 82, a hydrogen stream 17 from the catalytic reforming zone 16, and/or a hydrogen stream 83 which can be make-up hydrogen from another source.

The outlet(s) of the HDA zone 82 discharge an effluent stream 84 and is in fluid communication with one or more inlets of the separation zone 85. The stream 84 includes gases and a liquid effluent mixture containing dearylated hydrocarbons. In certain embodiments (not shown), effluents from the hydrodearylation reaction vessels are cooled in an exchanger and sent to a high pressure cold or hot separator and liquid effluents are passed to the separation zone 85. The separation zone 85 can include a distillation column (for example having 5 or more theoretical trays), a flash unit and/or a stripper, and includes at least a first and second outlet for discharging a tops stream 86 and a bottoms heavy dearylated stream 87. In certain embodiments, gases such as $H_2$ and $C_1$-$C_4$ hydrocarbons (fuel gas and LPG) are removed separately from the tops stream 86. In certain embodiments the tops stream 86 comprises liquid products including light naphtha range hydrocarbon components, along with gases such as $H_2$ and $C_1$-$C_4$ hydrocarbons, wherein gases are separated at a later stage. In additional embodiments the tops stream 86 also contains heavy naphtha range hydrocarbon components or a light fraction thereof (for instance, having nominal boiling points of less than about 180° C.). In certain embodiments the tops stream 86 includes monoaromatic compounds. In certain embodiments, the tops stream 86 comprises light naphtha and/or full range naphtha (with gases separated by one or more other separators between the HDA reactor and the separator 85). The dearylated stream 87 contains remaining hydrocarbons, depending on the selected cut point(s), and includes dearylated compounds. For example, the dearylated stream 87 can contain naphtha range and heavier hydrocarbons, heavy naphtha range and heavier hydrocarbons, middle distillate range and heavier hydrocarbons, or diesel range distillates. The dearylated stream 87 can include alkylaromatics, alkyl-bridged non-condensed di-aromatics and condensed di-aromatic hydrocarbon compounds.

The outlet(s) of the separation zone 85 discharging the dearylated stream 87 are in fluid communication with one or more inlets of the HGN zone 88 for hydrogenation and low pressure hydrocracking. In certain embodiments the HGN zone 88 is also in fluid communication with a source of an additional feedstream 101b as indicated by dashed lines. In additional embodiments in which transalkylation is incorporated, all or a portion of a bottoms stream 74 of $C_{11}+$ alkylaromatics from the separation column 72 is in fluid communication with the HGN zone 88. The HGN zone 88 is in fluid communication with one or more sources of hydrogen including recycled hydrogen from the HGN zone 88, a hydrogen stream 17 from the catalytic reforming zone 16, and/or a hydrogen stream 89 which can be make-up hydrogen from another source.

The outlet(s) of the HGN zone 88 discharge an effluent stream 90 which includes hydrogenated liquids and gases, and are in fluid communication with one or more inlets of the separation zone 91. In certain embodiments (not shown), effluents from the hydrogenation reaction vessel(s) are cooled in an exchanger and sent to a high pressure cold or hot separator and hydrogenated liquid effluents are passed to the separation zone 91. In certain embodiments (not shown) all or a portion of the effluent stream 90 from the HGN zone 88 can pass to the upstream separation zone 95 that receives the aromatic bottoms 20. The separation zone 91 can include a distillation column (for example having 5 or more theoretical trays), a flash unit and/or a stripper, and includes at least a first and second outlet for discharging a tops liquid hydrogenated effluent stream 92 and/or 92*a*, and a heavy hydrocarbon stream 93 and/or 93*a*. In further embodiments, the heavy stream is also separated and can be recycled within the aromatic complex bottoms treatment zone 81, utilized as fuel oil, directed to one or more hydroprocessing units within the refinery, and/or directed to a diesel or jet/kerosene pool.

The feed to the HDA zone 82 contains aromatics including alkylaromatics as a major portion, a significant portion or a substantial portion of its composition. In addition, the feed to the HDA zone 82 contains alkyl-bridged non-condensed di-aromatics and condensed di-aromatic hydrocarbon compounds. The HDA zone 82 is operable to convert aromatics in the liquid effluent from hydrodearylation into naphthenes. In addition, the HDA zone 82 is operable convert alkyl-bridged non-condensed di-aromatics and condensed di-aromatic hydrocarbon compounds that are contained in the feed into mono-aromatic hydrocarbon compounds and mono-naphthenic hydrocarbon compounds. Further, the HDA zone 82 is operable to crack (ring opening) of partially hydrogenated condensed diaromatics (tetralins) to form mono-aromatics.

In operation of the system depicted in FIG. 2A, the HDA zone 82 receives all or a portion of the bottoms stream 97 from the separation zone 95, and in certain embodiments also the stream 98 (shown in dashed lines), derived from the aromatic bottoms stream 20. In operation of the system shown in FIG. 2B, the HDA zone 82 receives all or a portion of the aromatic bottoms 20. The aromatic bottoms 20 or the heavy portion 97 thereof (optionally in combination with a slipstream 98), and hydrogen, are charged to the reactor(s) of the HDA zone 82. In embodiments in which transalkylation is incorporated, all or a portion of a bottoms stream 74 of $C_{11}+$ alkylaromatics from the separation column 72 can be directed to the HDA zone 82. In certain embodiments the bottoms stream 74 is a major portion, a significant portion, a substantial portion feed or all of the feed to the HDA zone 82. Hydrogen is provided in an effective quantity of hydrogen to support the hydrogenation and low pressure hydrocracking of the aromatic compounds in the feed, the reaction conditions, the selected catalysts and other factors, and can be any combination including recycle hydrogen from optional gas separation subsystems (not shown) between the reaction zone and fractionating zone, catalytic reformer hydrogen stream 17, and make-up hydrogen stream 83.

The HDA reaction vessel effluent is typically passed to one or more high pressure and low pressure separation stages to recover recycle hydrogen. For example, effluents from the HDA reaction vessel are cooled in an exchanger and sent to a high pressure hot and/or cold separator. Separator tops are cleaned in an amine unit and the resulting hydrogen rich gas stream is passed to a recycling compressor to be used as a recycle gas in the reaction vessel. Separator bottoms from the high pressure separator, which are in a substantially liquid phase, are cooled and then introduced to a low pressure cold separator. Remaining gases including hydrogen and any light hydrocarbons, which can include $C_1$-$C_4$ hydrocarbons, can be conventionally purged from the low pressure cold separator and sent for further processing or flaring. The liquid stream from the low pressure cold separator is stream 84 that is passed to the separation zone 85.

The HDA zone 82 includes an effective reactor configuration with the requisite reaction vessel(s), feed heaters, heat exchangers, hot and/or cold separators, product fractionators, strippers, and/or other units to process the feedstream derived from the aromatic complex bottoms. The HDA zone generally contains one or more fixed-bed, ebullated-bed, slurry-bed, moving bed, continuous stirred tank (CSTR) or tubular reactors, in series or parallel arrangement, which is/are generally operated in the presence of hydrogen under conditions, and utilizes catalyst(s), effective for hydrodearylation of the aromatic complex bottoms or the heavy portion thereof. Additional equipment, including exchangers, furnaces, feed pumps, quench pumps, and compressors to feed the reactor(s) and maintain proper operating conditions, are well known and are considered part of the HDA zone 82. In addition, equipment including pumps, compressors, high temperature separation vessels, low temperature separation vessels and the like to separate reaction products and provide hydrogen recycle within the HDA zone 82, are well known and are considered part of the HDA zone 82.

In certain embodiments, the HDA zone 82 operating conditions include:

a reactor temperature (° C.) in the range of from about 150-450, 200-450, 250-450, 150-400, 200-400, 250-400, 150-350, 200-350 or 250-350;

a hydrogen partial pressure (bars) in the range of from about 5-50, 10-50, 5-40, 10-40, 5-30, 10-30, 5-25, 10-25, 5-20 or 10-20;

a hydrogen gas feed rate (standard liters per liter of hydrocarbon feed, SLt/Lt) up to about 1000, 500, 300 or 100, in certain embodiments from about 1-1000, 100-1000, 1-500, 100-500, 1-300, 100-500 or 1-100; and a liquid hourly space velocity ($h^{-1}$), on a fresh feed basis relative to the catalysts, in the range of from about 0.5-10.0, 0.5-6.0, 0.5-5.0, 0.5-4.0, 0.5-2.0, 0.8-10.0, 0.8-6.0, 0.8-5.0, 0.8-4.0 or 0.8-2.0.

A suitable hydrodearylation catalyst used in the HDA zone 82 can be one or more conventionally known, commercially available or future developed hydrodearylation catalysts effective to maximize conversion of alkyl-bridged non-condensed di-aromatics and condensed di-aromatic hydrocarbon compounds into mono-aromatic hydrocarbon compounds and mono-naphthenic hydrocarbon compounds. The selection, activity and form of the hydrodearylation catalyst can be determined based on factors including, but not limited to operating conditions, selected reactor configuration, feedstock composition, catalyst composition and desired degree of conversion.

Suitable hydrodearylation catalysts contain one or more active components of metals or metal compounds (oxides, carbides or sulfides) selected from the Periodic Table of the Elements IUPAC Groups 4, 5, 6, 7, 8, 9, 10 and/or 11. In certain embodiments the active components of metals or metal compounds (oxides, carbides or sulfides) are selected from IUPAC Groups 6, 8, 9 and/or 10. In certain embodiments at least two active components of metals or metal compounds (oxides, carbides or sulfides) are provided, including one selected from IUPAC Groups 8, 9 and/or 10, and another from IUPAC Group 6. In certain embodiments the active component of the hydrodearylation catalyst is selected from the group consisting of Fe, Co, Ni, Mo and W. In certain embodiments an active component is selected from the group consisting of Fe, Co and Ni, and a further active component is selected from the group consisting of Mo and W. In certain embodiments two or more of the active components mentioned above are used in the hydrodearylation catalyst.

The active component(s) of the hydrodearylation catalysts are typically deposited or otherwise incorporated on a support such as amorphous or crystalline alumina, γ-alumina, silica-alumina, titania or a combination thereof. In certain embodiments the support of the hydrodearylation catalyst contains about 0.1-80, 0.1-30, 0.1-20, 0.1-15, 0.1-10, 0.5-80, 0.5-30, 0.5-20, 0.5-15, 0.5-10, 1-80, 1-30, 1-20, 1-15, 1-10, 2.5-80, 2.5-30, 2.5-20, 2.5-15, or 2.5-10 W %, of zeolite. The zeolite can be a suitable form of zeolite, including but not limited to one or more of (USY), (*BEA), (FAU), (MFI), (MOR), (MTW) or (MWW) zeolite framework topologies, or another effective form. In certain embodiments the catalyst can include Ni and Mo as active components, on a support of USY zeolite (or another effective form) and one or both of silica-alumina or γ-alumina.

Combinations of active components of the hydrodearylation catalyst can be composed of different particles/granules containing a single active metal species, or particles containing multiple active components. The active components of the hydrodearylation catalyst can be provided in the range of about (W % based on the mass of the active component(s) relative to the total mass of the catalyst) 1-45, 1-35, 1-25, 3-45, 3-35 or 3-25. In certain embodiments the hydrodearylation catalyst contains an IUPAC Groups 8, 9 and/or 10 active component in the range of about (W % based on the mass of the active component(s) relative to the total mass of the catalyst) 1-25, 1-20, 1-15, 2-25, 2-20 or 2-15, and an IUPAC Group 6 active component in the range of about (W % based on the mass of the active component(s) relative to the total mass of the catalyst) 0.5-30, 0.5-25, 0.5-20, 1-30, 1-25, or 1-20. In certain embodiments, the particles of the hydrodearylation have a pore volume in the range of about (cc/gm) 0.15-1.70, 0.15-1.50, 0.30-1.50 or 0.30-1.70; a specific surface area in the range of about ($m^2$/g) 100-450, 100-350, 100-300, 150-450, 150-350, 150-300, 200-450, 200-350 or 200-300; and an average pore diameter of at least about 10, 50, 100, 200, 500 or 1000 angstrom units.

In certain embodiments, the catalyst and/or the catalyst support of the hydrodearylation catalysts is prepared in accordance with U.S. Pat. Nos. 9,221,036 and 10,081,009 (jointly owned by the owner of the present application, and subject to a joint research agreement), which are incorporated herein by reference in their entireties, includes a modified USY zeolite support having one or more of Ti, Zr and/or Hf substituting the aluminum atoms constituting the zeolite framework thereof. For instance, the hydrodearylation catalysts can include an active component carried on a support containing an ultra-stable Y-type zeolite, wherein the above ultra-stable Y-type zeolite is a framework-substituted zeolite (referred to as a framework-substituted zeolite) in which a part of aluminum atoms constituting a zeolite framework thereof is substituted with 0.1-5 mass % zirconium atoms and 0.1-5 mass % titanium ions calculated on an oxide basis.

In certain embodiments, the hydrogen stream to the HDA zone 82 includes a combination of a recycled hydrogen stream and a makeup hydrogen stream. The hydrogen stream can contain at least 70, 80 or 90 mol % hydrogen by weight. In various embodiments, the recycled hydrogen stream may be a stream from the processing of a hydrocarbon product from the reactor. In various embodiments, the recycled hydrogen stream may be combined with the feedstock stream to form a combined feedstock stream that is fed to the reactor. In various embodiments, the hydrogen stream may be combined with the combined feed stream to form a second combined stream that is fed to the reactor. In various embodiments, the recycled hydrogen stream, the make-up hydrogen stream, and the feedstock stream may be combined in any order to form a combined stream that is fed to the reactor. In various embodiments, the recycled hydrogen stream, the make-up hydrogen stream, and the feedstock stream may be fed separately to the reactor or two of the streams may be combined and the other fed separately to the reactor. In various embodiments, the hydrogen stream has a portion of the stream fed directly to one or more catalyst beds of the reactor.

The catalyst may be provided as a catalyst bed in the reactor. In certain embodiments, a portion of the hydrogen stream is fed to the catalyst bed of the reactor to quench the catalyst bed. The catalyst bed may include two or more catalyst beds.

In certain embodiments, the feedstock (either whole or fractionated) to the HDA zone 82 is mixed with an excess of hydrogen gas in a mixing zone. A portion of the hydrogen gas is mixed with the feedstock to produce a hydrogen-enriched liquid hydrocarbon feedstock. This hydrogen-enriched liquid hydrocarbon feedstock and undissolved hydrogen is supplied to a flashing zone in which at least a portion of undissolved hydrogen is flashed, and the hydrogen is recovered and recycled. The hydrogen-enriched liquid hydrocarbon feedstock from the flashing zone is supplied as a feed stream to the HDA zone 82. The HDA liquid product stream that is recovered from the HDA zone 82 is further processed and/or recovered as provided here.

The aromatic complex bottoms treatment zone 81 as shown in both FIGS. 2A and 2B includes an HGN zone 88 generally operable to convert the hydrodearylation reaction liquid effluent stream 87 into one or more additional product streams from which BTX/BTEX and/or suitable gasoline blending components, and other valuable products, are obtained. The conversion includes formation of mono-aromatics and/or mono-naphthenes. The process allows for production of additional aromatic products and/or gasoline blending pool components. For example, the HGN zone 88 is operable to hydrogenate the liquid effluent stream 87 with a suitable hydrogenation catalyst.

In general, the HGN zone 88 includes one or more outlets for discharging an effluent stream 90 which includes hydrogenated liquids and gases. The HGN zone 88 reactor(s) include one or more inlets in fluid communication with the HDA zone 82 outlet(s), shown as the bottoms stream 87 from the HDA effluent separation zone 85. In certain embodiments the HGN zone 88 is also in fluid communication with a source of an additional feedstream 101b as indicated by dashed lines. In additional embodiments in which transalkylation is incorporated, all or a portion of a bottoms stream 74 of $C_{11}$+ alkylaromatics from the separation column 72 is in fluid communication with the HGN zone 88. The HGN zone 88 is in fluid communication with one or more sources of hydrogen including recycled hydrogen from the HGN zone 88, a hydrogen stream 17 from the catalytic reforming zone 16, and/or a hydrogen stream 89 which can be make-up hydrogen from another source. The outlet(s) of the HGN zone 88 discharge the effluent 90 that is separated via the separation zone 91 into the tops hydrogenation effluent stream 92 and/or 92a, and the heavy hydrogenated bottoms stream 93 and/or 93a. The tops hydrogenation effluent can include $C_1$-$C_4$ hydrocarbons (fuel gas and LPG). In certain embodiments light naphtha range hydrocarbon components, or a light fraction of heavy naphtha range hydrocarbon components (for instance, having nominal boiling points of less than about 180° C.) are also separated (via stream 92 or a separate stream), and can be passed to a light naphtha pool for use, for instance, as steam cracking feed or as isomerization feed. In certain embodiments the tops hydrogenation effluent stream 92 and/or 92a includes monoaromatic compounds.

In certain embodiments, the outlet(s) of the separation zone 91 for discharging the hydrogenated stream are in fluid communication with one or more inlets of the catalytic reforming zone 16 for recycle as reformate blending components, one or more inlets of the aromatic complex 19 for recycle as aromatics for separation, or a combination thereof to improve gasoline volume and quality, indicated in dashed lines as stream 92a. In certain embodiments, the hydrogenated stream 92a can be in fluid communication with the aromatic complex 19 via the reformate splitter 24 and/or the heavy reformate splitter 30, described above with respect to FIG. 1B. In certain embodiments in which transalkylation is integrated, for instance as described above with respect to FIG. 1C, the hydrogenated stream 92 and/or 92a can be in fluid communication with a transalkylation reaction zone, for instance as all or a part of $C_9$+ alkylaromatics feedstream 49 described herein, for instance after removal of gases. In certain embodiments (not shown), effluents from the reaction vessels are cooled in an exchanger and sent to a high pressure cold or hot separator and liquid effluents are discharged as the intermediate hydrogenated effluent stream 92 and/or 92a In certain embodiments stream 92a contains all, a substantial portion, a significant portion, or a major portion of the total hydrogenated effluent stream. Any remainder can be discharged as stream 92, which can be directed elsewhere in the refinery for fuel and/or petrochemical production.

In further embodiments, all or a portion of the heavy products separated from the separation zone 91 are discharged, shown as in dashed lines as heavy stream 93 which can be utilized as fuel oil, directed to one or more hydroprocessing units within the refinery (for instance in combination with streams 12 and/or 13 to enhance production of additional diesel, jet fuel and/or kerosene), and/or directed to a diesel or jet/kerosene pool as a blending component. In certain embodiments all or a portion of heavy products separated from the separation zone 91 are recycled, shown in dashed lines as stream 93a, within the aromatic complex bottoms treatment zone 81 to admix with streams 84 and/or 87.

In addition to hydrogenation reactions to convert aromatics to naphthenes, further hydrodearylation can also occur. Non-condensed di-aromatic hydrocarbon compounds including alkyl-bridged non-condensed di-aromatics, and condensed di-aromatic hydrocarbon compounds, that were not dearylated in the HDA zone 82 and are contained in the feed to the HGN zone 88, are converted by hydrodearylation into mono-aromatic hydrocarbon compounds and mono-naphthenic hydrocarbon compounds. In addition, in certain embodiments, some mono-aromatic species are formed including xylene and ethyl benzene, with a higher selectivity for these C8 mono-aromatics as compared to toluene and benzene.

In operation of the system depicted in FIGS. 2A and 2B, the HGN zone 88 receives all or a portion of the dearylated stream 87 from the separation zone 85, and hydrogen. In certain embodiments (as shown in both FIGS. 2A and 2B in dashed lines) an additional feedstream 101b is directed to the HGN zone 88. In embodiments in which transalkylation is incorporated, all or a portion of a bottoms stream 74 of $C_{11}$+ alkylaromatics from the separation column 72 can be directed to the HGN zone 88. Hydrogen is provided in an effective quantity of hydrogen to support the hydrogenation of the aromatic compounds in the feed, the reaction conditions, the selected catalysts and other factors, and can be any combination including recycle hydrogen from optional gas separation subsystems (not shown) between the reaction zone and fractionating zone, catalytic reformer hydrogen stream 17, and make-up hydrogen stream 89.

The HGN reaction vessel effluent contains liquid effluents and gases such as $H_2$ and $C_1$-$C_4$ hydrocarbons (fuel gas and LPG), and typically can be passed to one or more high pressure and low pressure separation stages to recover recycle hydrogen. For example, reaction vessel effluents from the HGN are cooled in an exchanger and sent to a high pressure hot and/or cold separator. Separator tops are cleaned in an amine unit and the resulting hydrogen rich gas stream is passed to a recycling compressor to be used as a recycle gas in the reaction vessel. Separator bottoms from the high pressure separator, which are in a substantially liquid phase, are cooled and then introduced to a low pressure cold separator. Remaining gases including hydrogen and any light hydrocarbons, which can include $C_1$-$C_4$ hydrocarbons, can be conventionally purged from the low pressure cold separator and sent for further processing. The liquid stream from the low pressure cold separator is the intermediate hydrogenated stream 90.

The HGN zone 88 includes an effective reactor configuration with the requisite reaction vessel(s), feed heaters, heat exchangers, hot and/or cold separators, product fractionators, strippers, and/or other units to process the feedstream derived from the aromatic complex bottoms. The HGN zone generally contains one or more fixed-bed, ebullated-bed, slurry-bed, moving bed, continuous stirred tank (CSTR) or tubular reactors, in series or parallel arrangement, which is/are generally operated in the presence of hydrogen under conditions, and utilizes catalyst(s), effective for hydrogenation and mild hydrocracking of the aromatic complex bottoms or the heavy portion thereof. Additional equipment, including exchangers, furnaces, feed pumps, quench pumps, and compressors to feed the reactor(s) and maintain proper operating conditions, are well known and are considered part of the HGN zone 88. In addition, equipment including pumps, compressors, high temperature separation vessels, low temperature separation vessels and the like to separate reaction products and provide hydrogen recycle within the HGN zone 88, are well known and are considered part of the HGN zone 88.

In certain embodiments, the HGN zone 88 is operable to favor formation of mono-aromatics and/or mono-naphthenes. In further embodiments the HGN zone 88 is operable to favor formation of naphthenes and/or naphtheno-aromatics and/or paraffins. Higher temperature and/or pressure conditions increases hydrogenation and ring-opening.

In certain embodiments, the HGN zone 88 operating conditions include:

a reactor temperature (° C.) in the range of from about 150-450, 200-450, 300-450, 350-450, 150-435, 200-435, 300-435, 350-435, 150-400, 200-400, 200-400 or 300-400;

a hydrogen partial pressure (bars) in the range of from about 5-100, 7-100, 15-100, 30-100, 5-70, 7-70, 15-70, 30-70, 5-60, 7-60, 15-60, 30-60, 5-55, 7-55, 15-55, 30-55, 5-52, 7-52, 15-52 or 30-52;

a hydrogen gas feed rate (standard liters per liter of hydrocarbon feed, SLt/Lt) up to about 5000, 3000 or 2500, in certain embodiments from about 500-5000, 500-3000, 500-2500, 1000-5000, 1000-3000 or 1000-2500; and a liquid hourly space velocity ($h^{-1}$), on a fresh feed basis relative to the catalysts, in the range of from about 0.5-10.0, 0.5-6.0, 0.5-5.0, 0.5-4.0, 0.5-2.0, 0.8-10.0, 0.8-6.0, 0.8-5.0, 0.8-4.0 or 0.8-2.0.

A suitable hydrogenation catalyst used in the HGN zone 88 can be one or more conventionally known, commercially available or future developed hydrogenation catalysts effective to maximize hydrogen transfer and to hydrogenate aromatics. The selection, activity and form of the hydrogenation catalyst can be determined based on factors including, but not limited to operating conditions, selected reactor configuration, feedstock composition, catalyst composition and desired degree of conversion. In certain embodiments if the delta temperature in a bed is greater than or equal to about 25° C., additional beds can be used with interbed hydrogen injection.

Suitable hydrogenation catalysts contain one or more active components of metals or metal compounds (oxides, carbides or sulfides) selected from the Periodic Table of the Elements IUPAC Groups 7, 8, 9 and/or 10. In certain embodiments the active component of the first functional catalyst is selected from the group consisting of Pt, Pd, Ti, Rh, Re, Ir, Ru, Ni, and combinations thereof. In certain embodiments the active components of the first functional catalyst include a noble metal selected from the group consisting of Pt, Pd, Rh, Re, Ir, Ru, and combinations thereof. In certain embodiments the active components of the hydrogenation catalyst include a noble metal selected from the group consisting of Pt, Pd, and combinations thereof. In certain embodiments two or more of the active components mentioned above are used in the hydrogenation catalyst.

The active component(s) of the hydrogenation catalysts are typically deposited or otherwise incorporated on a support such as amorphous or crystalline alumina, γ-alumina, silica-alumina, titania or a combination thereof. In certain embodiments non-acidic amorphous alumina is effective. In certain embodiments the support of the hydrogenation catalyst contains about 0.1-80, 0.1-30, 0.1-20, 0.1-15, 0.1-10, 0.5-80, 0.5-30, 0.5-20, 0.5-15, 0.5-10, 1-80, 1-30, 1-20, 1-15, 1-10, 2.5-80, 2.5-30, 2.5-20, 2.5-15, or 2.5-10 W %, of zeolite. The zeolite can be a suitable form of zeolite, including but not limited to one or more of (USY), (*BEA), (FAU), (MFI), (MOR), (MTW) or (MWW) zeolite framework topologies, or another effective form. In certain embodiments non-acidic catalysts are selected as the first functional catalysts so as to favor hydrogenation reactions over hydrocracking reactions. Particularly effective hydrogenation catalysts include noble metal active catalyst components on non-acidic supports, such as Pt, Pd or combinations thereof on non-acidic supports. In certain embodiments suitable hydrogenation catalysts include USY zeolite supports or another effective form, having Pt and/or Pd as the active component.

Combinations of active components of the hydrogenation catalyst can be composed of different particles/granules containing a single active metal species, or particles containing multiple active components. The active components of the hydrogenation catalyst can be provided in the range of about (W % based on the mass of the active component(s) relative to the total mass of the catalyst) 0.01-2, 0.05-2, 0.1-2, 0.1-1 or 0.1-0.5. In certain embodiments, the particles of the hydrogenation catalyst have a pore volume in the range of about (cc/gm) 0.15-1.70, 0.15-1.50, 0.30-1.50 or 0.30-1.70; a specific surface area in the range of about ($m^2$/g) 100-450, 100-350, 100-300, 150-450, 150-350, 150-300, 200-450, 200-350 or 200-300; and an average pore diameter of at least about 10, 50, 100, 200, 500 or 1000 angstrom units.

In certain embodiments, the catalyst and/or the catalyst support of the hydrogenation catalysts is prepared in accordance with U.S. Pat. Nos. 9,221,036 and 10,081,009 (jointly owned by the owner of the present application, and subject to a joint research agreement), which are incorporated herein by reference in their entireties, includes a modified USY zeolite support having one or more of Ti, Zr and/or Hf substituting the aluminum atoms constituting the zeolite framework thereof. For instance, the hydrogenation catalysts can include an active component carried on a support containing an ultra-stable Y-type zeolite, wherein the above ultra-stable Y-type zeolite is a framework-substituted zeolite (referred to as a framework-substituted zeolite) in which a part of the aluminum atoms constituting a zeolite framework thereof is substituted with 0.1-5 mass % zirconium atoms and 0.1-5 mass % titanium ions calculated on an oxide basis.

In certain embodiments, the hydrogen stream to the HGN zone 88 includes a combination of a recycled hydrogen stream and a makeup hydrogen stream. The hydrogen stream can contain at least 70, 80 or 90 mol % hydrogen by weight. In various embodiments, the recycled hydrogen stream may be a stream from processing of a hydrocarbon product from the reactor. In various embodiments, the recycled hydrogen stream may be combined with the feedstock stream to form a combined feedstock stream that is fed to the reactor. In various embodiments, the hydrogen stream may be combined with the combined feed stream to form a second combined stream that is fed to the reactor. In various embodiments, the recycled hydrogen stream, the make-up hydrogen stream, and the feedstock stream may be combined in any order to form a combined stream that is fed to the reactor. In various embodiments, the recycled hydrogen stream, the make-up hydrogen stream, and the feedstock stream may be fed separately to the reactor or two of the streams may be combined and the other fed separately to the reactor. In various embodiments, the hydrogen stream has a portion of the stream fed directly to one or more catalyst beds of the reactor.

The catalyst may be provided as a catalyst bed in the reactor. In certain embodiments, a portion of the hydrogen stream is fed to the catalyst bed of the reactor to quench the catalyst bed. The catalyst bed may include two or more catalyst beds.

In certain embodiments, the feedstock (either whole or fractionated) to the HGN zone 88 is mixed with an excess of hydrogen gas in a mixing zone. A portion of the hydrogen gas is mixed with the feedstock to produce a hydrogen-enriched liquid hydrocarbon feedstock. The hydrogen-enriched liquid hydrocarbon feedstock and undissolved hydrogen are supplied to a flashing zone in which at least a portion of undissolved hydrogen is flashed, and the hydrogen is recovered and recycled. The hydrogen-enriched liquid hydrocarbon feedstock from the flashing zone is supplied as a feed stream to the HGN zone 88. The HGN liquid product stream that is recovered from the HGN zone 88 is further processed and/or recovered as provided here.

The HGN zone 88 effluent stream 90 is separated into the tops liquid hydrogenation effluent stream 92 and/or 92*a*, and the heavy hydrocarbon stream 93 and/or 93*b*. In certain embodiments, gases such as $H_2$ and $C_1$-$C_4$ hydrocarbons (fuel gas and LPG) are removed separately from the liquid hydrogenation effluent stream 92 and/or 92*a*. In certain embodiments the liquid hydrogenation effluent stream 92 and/or 92a comprises light naphtha range hydrocarbon components, along with gases such as $H_2$ and $C_1$-$C_4$ hydrocarbons, wherein gases are separated at a later stage. In additional embodiments the liquid hydrogenation effluent stream 92 and/or 92a also contains heavy naphtha range hydrocarbon components or a light fraction thereof (for instance, having nominal boiling points of less than about 180° C.). In certain embodiments the liquid hydrogenation effluent stream 92 and/or 92a includes monoaromatic compounds and mono-naphthenes. In certain embodiments, the liquid hydrogenation effluent stream 92 and/or 92a comprises light naphtha and/or full range naphtha (with gases separated by one or more other separators between the HGN reactor and the separator 91). The heavy hydrocarbon stream 93 and/or 93b contains remaining hydrocarbons, depending on the selected cut point(s). For example, the heavy hydrocarbon stream 93 and/or 93b can contain naphtha range and heavier hydrocarbons, heavy naphtha range and heavier hydrocarbons, middle distillate range and heavier hydrocarbons, or diesel range distillates.

For the purpose of these simplified schematic illustrations and description, the numerous valves, temperature sensors, electronic controllers and the like that are customarily employed and well known to those of ordinary skill in the art are not included. Accompanying components that are in conventional hydrotreating and reformer units such as, for example, bleed streams, spent catalyst discharge sub-systems, and catalyst replacement sub-systems are also not shown.

The methods and systems of the present invention have been described above and in the attached drawings; however, modifications will be apparent to those of ordinary skill in the art and the scope of protection for the invention is to be defined by the claims that follow.

The invention claimed is:

1. A process comprising:
    hydrotreating an initial naphtha stream to produce hydrotreated naphtha;
    catalytically reforming the hydrotreated naphtha to produce reformate;
    passing all or a portion of the reformate to an aromatic complex for separation into gasoline pool components, C6-C8 aromatic products and $C_9$+ aromatic bottoms;
    reacting a feedstream comprising all or a portion of the $C_9$+ aromatic bottoms in the presence of a hydrodearylation catalyst and hydrogen under specified reaction conditions for hydrodearylation to produce at least liquid effluents containing dearylated hydrocarbons;
    reacting the liquid effluents from hydrodearylation in the presence of a hydrogenation catalyst and hydrogen under specified reaction conditions to produce at least liquid hydrogenation effluents and heavy hydrocarbons; and
    passing all or a portion of the liquid effluent containing hydrogenated hydrocarbons to the step of hydrotreating the initial naphtha stream.

2. The process as in claim 1, wherein the aromatic complex includes a xylene rerun unit, and wherein the feedstream comprises $C_9$+ alkylaromatics from the xylene rerun unit.

3. The process as in claim 1, further wherein the aromatic complex includes or is in fluid communication with a transalkylation zone for transalkylation of aromatics to produce $C_8$ aromatic compounds and $C_{11}$+ aromatic compounds, and wherein the all or a portion of the feedstream to hydrodearylation comprises $C_{11}$+ aromatics from the transalkylation zone.

4. The process as in claim 1, further comprising reacting one or more additional streams with the feedstream in the presence of the hydrodearylation catalyst, wherein the one or more additional streams are selected from a group consisting of vacuum gas oil, demetallized oil, hydrocracker bottoms and atmospheric residue.

5. The process as in claim 1, further comprising reacting one or more additional streams with the liquid effluents from hydrodearylation in the presence of the hydrogenation catalyst, wherein the one or more additional streams are selected from a group consisting of vacuum gas oil, demetallized oil, hydrocracker bottoms and atmospheric residue.

6. The process as in claim 1, wherein hydrodearylation occurs:
    at a reactor temperature (° C.) in the range of from about 150-450;
    under a hydrogen partial pressure (bars) in the range of from about 5-50;
    with a hydrogen gas feed rate (SLt/Lt) of about 500-5000; and
    a liquid hourly space velocity ($h^{-1}$), on a fresh feed basis relative to the catalysts, in the range of from about 0.5-10.0.

7. The process as in claim 1, wherein the hydrodearylation catalysts contains one or more active components selected from a group consisting of Fe, Co, Ni, Mo and W, provided on a support material selected from a group consisting of alumina, silica-alumina, titania, zeolite, and combinations including two or more of the support materials.

8. The process as in claim 1, wherein hydrogenation occurs:
    at a reactor temperature (° C.) in the range of from about 150-450;
    under a hydrogen partial pressure (bars) in the range of from about 5-100;
    with a hydrogen gas feed rate (SLt/Lt) of about 500-5000; and
    a liquid hourly space velocity ($h^{-1}$), on a fresh feed basis relative to the catalysts, in the range of from about 0.5-10.0.

9. The process as in claim 1, wherein the hydrogenation catalysts contains one or more active components selected from a group consisting of Pt, Pd, Ti, Rh, Re, Ir, Ru, and Ni, provided on a support material selected from a group consisting of alumina, silica-alumina, titania, zeolite, and combinations including two or more of the support materials.

10. The process as in claim 1, wherein a first portion of the liquid effluent containing hydrogenated hydrocarbons is passed to the step of hydrotreating the initial naphtha stream, and further comprising passing a second portion of the liquid effluent containing hydrogenated hydrocarbons to catalytic reforming.

11. The process as in claim 1, wherein a first portion of the liquid effluent containing hydrogenated hydrocarbons is passed to the step of hydrotreating the initial naphtha stream, and further comprising passing a second portion of the liquid effluent containing hydrogenated hydrocarbons to the aromatic complex.

12. The process as in claim 1, further comprising, prior to reacting for hydrodearylation, separating all or a portion of the $C_9$+ aromatic bottoms into a tops fraction and a bottoms fraction, and wherein the feedstream that is reacted for hydrogenation comprises all or a portion of the bottoms fraction.

13. A process for treatment of $C_9$+ aromatic bottoms obtained from catalytic reforming of naphtha followed by separation in an aromatic complex into gasoline pool components, C6-C8 aromatic products stream and the $C_9+$ aromatic bottoms, the process comprising:
- separating a first portion of the $C_9+$ aromatic bottoms into a tops fraction and a bottoms fraction;
- reacting a feedstream in the presence of a hydrodearylation catalyst and hydrogen under specified reaction conditions for hydrodearylation to produce at least liquid effluents containing dearylated hydrocarbons, the feedstream comprising a second portion of the $C_9+$ aromatic bottoms and all or a portion of the bottoms fraction separated from the first portion of the $C_9+$ aromatic bottoms; and
- reacting the liquid effluents from hydrodearylation in the presence of a hydrogenation catalyst and hydrogen under specified reaction conditions to produce at least liquid hydrogenation effluents and heavy hydrocarbons.

14. The process as in claim 13, further comprising supplying all or a portion of the tops fraction to a reactor in the presence of a transalkylation catalyst and hydrogen under specified reaction conditions for transalkylation of aromatics to produce $C_8$ aromatic compounds.

15. The process as in claim 13, wherein the tops fraction comprises $C_9$ and $C_{10}$ aromatic compounds and the bottoms fraction comprises $C_{11}+$ aromatic compounds.

16. The process as in claim 13, wherein the tops fraction comprises $C_9$ aromatic compounds and the bottoms fraction comprises $C_{10}+$ aromatic compounds.

17. The process as in claim 13, wherein the tops fraction comprises naphtha range hydrocarbons and the bottoms fraction comprises diesel range hydrocarbons.

18. The process as in claim 13, wherein the aromatic complex includes a xylene rerun unit, and wherein the feedstream comprises $C_9+$ alkylaromatics from the xylene rerun unit.

19. The process as in claim 13, further wherein the aromatic complex includes or is in fluid communication with a transalkylation zone for transalkylation of aromatics to produce $C_8$ aromatic compounds and $C_{11}+$ aromatic compounds, and wherein the all or a portion of the feedstream to hydrodearylation comprises $C_{11}+$ aromatics from the transalkylation zone.

20. The process as in claim 13, further comprising reacting one or more additional streams with the feedstream in the presence of the hydrodearylation catalyst, wherein the one or more additional streams are selected from a group consisting of vacuum gas oil, demetallized oil, hydrocracker bottoms and atmospheric residue.

21. The process as in claim 13, further comprising reacting one or more additional streams with the liquid effluents from hydrodearylation in the presence of the hydrogenation catalyst, wherein the one or more additional streams are selected from a group consisting of vacuum gas oil, demetallized oil, hydrocracker bottoms and atmospheric residue.

22. The process as in claim 13, wherein hydrodearylation occurs:
- at a reactor temperature (° C.) in the range of from about 150-450;
- under a hydrogen partial pressure (bars) in the range of from about 5-50;
- with a hydrogen gas feed rate (SLt/Lt) of about 500-5000; and
- a liquid hourly space velocity ($h^{-1}$), on a fresh feed basis relative to the catalysts, in the range of from about 0.5-10.0.

23. The process as in claim 13, wherein the hydrodearylation catalysts contains one or more active components selected from a group consisting of Fe, Co, Ni, Mo and W, provided on a support material selected from a group consisting of alumina, silica-alumina, titania, zeolite, and combinations including two or more of the support materials.

24. The process as in claim 13, wherein hydrogenation occurs:
- at a reactor temperature (° C.) in the range of from about 150-450;
- under a hydrogen partial pressure (bars) in the range of from about 5-100;
- with a hydrogen gas feed rate (SLt/Lt) of about 500-5000; and
- a liquid hourly space velocity ($h^{-1}$), on a fresh feed basis relative to the catalysts, in the range of from about 0.5-10.0.

25. The process as in claim 13, wherein the hydrogenation catalysts contains one or more active components selected from a group consisting of Pt, Pd, Ti, Rh, Re, Ir, Ru, and Ni, provided on a support material selected from a group consisting of alumina, silica-alumina, titania, zeolite, and combinations including two or more of the support materials.

26. The process as in claim 13, further comprising passing all or a portion of the liquid effluent containing hydrogenated hydrocarbons to catalytic reforming.

27. The process as in claim 13, wherein catalytic reforming is preceded by a naphtha hydrotreating zone, and further comprising passing all or a portion of the liquid effluent containing hydrogenated hydrocarbons to the naphtha hydrotreating zone.

28. The process as in claim 13, further comprising passing all or a portion of the liquid effluent containing hydrogenated hydrocarbons to the aromatic complex.

29. The process as in claim 28, wherein the aromatic complex includes a reformate splitter operable to separate reformate into light reformate stream and a heavy reformate stream, further comprising passing all or a portion of the liquid effluent containing hydrogenated hydrocarbons to the reformate splitter.

30. The process as in claim 28, wherein the aromatic complex includes a reformate splitter operable to separate reformate into light reformate stream and a heavy reformate stream, and a heavy reformate splitter operable to separate heavy reformate into a $C_7$ stream and a $C_8+$ stream, and further comprising passing all or a portion of the liquid effluent containing hydrogenated hydrocarbons to the heavy reformate splitter.

31. The process as in claim 13, wherein hydrodearylation is operable to break bridges between rings of alkyl-bridged, non-condensed multi-aromatics contained in the feedstream.

32. The process as in claim 13, wherein hydrogenation is operable to convert aromatics in the liquid effluent from hydrodearylation into naphthenes.

33. The process as in claim 13, wherein hydrogenation is operable to partially hydrogenate condensed diaromatics in the liquid effluent from hydrodearylation.

34. The process as in claim 13, wherein hydrogenation is operable to crack partially hydrogenated condensed diaromatics to form mono-aromatics.

35. A system comprising:
- a naphtha hydrotreating zone comprising one or more reactors for hydrotreating naphtha and including one or more outlets for discharging hydrotreated naphtha;

a catalytic reforming zone comprising one or more reactors and having one or more inlets in fluid communication with the one or more outlets of the naphtha hydrotreating zone for discharging hydrotreated naphtha, one or more outlets for discharging gases containing hydrogen, and one or more outlets for discharging reformate;

an aromatic complex comprising at least one splitter and having one or more inlets in fluid communication with at least one of one or more outlets for discharging reformate, one or more outlets for discharging gasoline pool components, one or more outlets for discharging C6-C8 aromatic products, and one or more outlets for discharging C9+ aromatic bottoms;

a hydrodearylation zone comprising one or more reactors and having one or more inlets in fluid communication with a source of hydrogen and at least one of the one or more outlets for discharging $C_9+$ aromatic bottoms, and one or more outlets for discharging dearylated effluents; and a hydrogenation zone comprising one or more reactors and having one or more inlets in fluid communication with a source of hydrogen and at least one of the one or more outlets of the hydrodearylation zone for discharging dearylated effluents, and one or more outlets for discharging liquid hydrogenation effluents and one or more outlets for discharging heavy hydrocarbons, wherein at least one of the one or more outlets for discharging liquid hydrogenation effluents is in fluid communication with the naphtha hydrotreating zone.

36. The system as in claim 35, further comprising a separation zone comprising a distillation column, a flash unit and/or stripper, and having one or more inlets in fluid communication with at least one of the one or more outlets for discharging $C_9+$ aromatic bottoms, one or more outlets for discharging a tops fraction, and one or more outlets for discharging a bottoms fraction, and wherein the one or more inlets of the hydrodearylation zone are in fluid communication with at least one of the one or more outlets of the separation zone for discharging a bottoms fraction.

37. A process for treatment of $C_9+$ aromatic bottoms obtained from catalytic reforming of naphtha followed by separation in an aromatic complex into gasoline pool components, C6-C8 aromatic products and the $C_9+$ aromatic bottoms, the process comprising:

reacting a feedstream comprising all or a portion of the $C_9+$ aromatic bottoms, and one or more additional streams selected from a group consisting of vacuum gas oil, demetallized oil, hydrocracker bottoms and atmospheric residue, in the presence of a hydrodearylation catalyst and hydrogen under specified reaction conditions for hydrodearylation to produce at least liquid effluents containing dearylated hydrocarbons; and reacting the liquid effluents from hydrodearylation in the presence of a hydrogenation catalyst and hydrogen under specified reaction conditions to produce at least liquid hydrogenation effluents and heavy hydrocarbons.

38. The process as in claim 37, further comprising, prior to reacting for hydrodearylation, separating all or a portion of the $C_9+$ aromatic bottoms into a tops fraction and a bottoms fraction, and wherein the feedstream that is reacted for hydrogenation comprises all or a portion of the bottoms fraction.

39. A process for treatment of $C_9+$ aromatic bottoms obtained from catalytic reforming of naphtha followed by separation in an aromatic complex into gasoline pool components, C6-C8 aromatic products and the $C_9+$ aromatic bottoms, the process comprising:

reacting a feedstream comprising all or a portion of the $C_9+$ aromatic bottoms in the presence of a hydrodearylation catalyst and hydrogen under specified reaction conditions for hydrodearylation to produce at least liquid effluents containing dearylated hydrocarbons; and reacting the liquid effluents from hydrodearylation, and one or more additional streams selected from a group consisting of vacuum gas oil, demetallized oil, hydrocracker bottoms and atmospheric residue, in the presence of a hydrogenation catalyst and hydrogen under specified reaction conditions to produce at least liquid hydrogenation effluents and heavy hydrocarbons.

40. The process as in claim 39, further comprising, prior to reacting for hydrodearylation, separating all or a portion of the $C_9+$ aromatic bottoms into a tops fraction and a bottoms fraction, and wherein the feedstream that is reacted for hydrogenation comprises all or a portion of the bottoms fraction.

* * * * *